(12) United States Patent
Kinoshita et al.

(10) Patent No.: US 9,412,989 B2
(45) Date of Patent: Aug. 9, 2016

(54) BATTERY CONNECTING ASSEMBLY

(75) Inventors: Yuko Kinoshita, Mie (JP); Hiroomi Hiramitsu, Mie (JP); Kensaku Takata, Mie (JP); Hiroki Hirai, Mie (JP); Katsunori Hamana, Mie (JP); Tomofumi Tsuji, Mie (JP); Mitsuhiro Akasaka, Mie (JP); Tetsuya Nakagawa, Mie (JP); Yoshinao Kobayashi, Mie (JP); Masaru Shitamichi, Mie (JP); Daiki Hirano, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 339 days.

(21) Appl. No.: 13/981,406

(22) PCT Filed: Jan. 27, 2012

(86) PCT No.: PCT/JP2012/051785
§ 371 (c)(1),
(2), (4) Date: Jul. 24, 2013

(87) PCT Pub. No.: WO2012/102373
PCT Pub. Date: Aug. 2, 2012

(65) Prior Publication Data
US 2013/0309553 A1 Nov. 21, 2013

(30) Foreign Application Priority Data

Jan. 28, 2011 (JP) ................................ 2011-017059
Nov. 28, 2011 (JP) ................................ 2011-259041

(51) Int. Cl.
*H01M 2/24* (2006.01)
*H01M 2/20* (2006.01)
*H01M 2/10* (2006.01)
*H01M 2/34* (2006.01)
*H01M 2/06* (2006.01)

(52) U.S. Cl.
CPC ............ *H01M 2/202* (2013.01); *H01M 2/1077* (2013.01); *H01M 2/206* (2013.01); *H01M 2/34* (2013.01); *H01M 2/06* (2013.01)

(58) Field of Classification Search
CPC ...... H01M 2/202; H01M 2/1077; H01M 2/06
See application file for complete search history.

(56) References Cited

U.S. PATENT DOCUMENTS 6,261,719 B1 7/2001 Ikeda et al.
7,488,201 B2 2/2009 Yoon et al.
(Continued)

FOREIGN PATENT DOCUMENTS

CN 101142699 3/2008
CN 101645543 2/2010
(Continued)

OTHER PUBLICATIONS

Search report from E.P.O., mail date is Nov. 17, 2014.
(Continued)

*Primary Examiner* — Jonathan Jelsma
(74) *Attorney, Agent, or Firm* — Greenblum & Bernstein, P.L.C.

(57) ABSTRACT

Each of connection units integrally includes a cover via a hinge, and the cover covers an accommodation portion in which a connecting member is arranged. The connection unit includes a unit stopper and a unit stopper receiver that is fitted to the unit stopper that is formed on an adjacent connection unit. The cover includes a cover stopper and a cover stopper receiver that is fitted to the cover stopper formed on the cover of the adjacent connection unit. The connection units are connected to each other by fitting of the unit stoppers and the unit stopper receivers and fitting of the cover stoppers and the cover stopper receivers.

14 Claims, 27 Drawing Sheets

(56) References Cited

U.S. PATENT DOCUMENTS

| | | |
|---|---|---|
| 7,828,611 B2 | 11/2010 | Nakamura et al. |
| 2006/0246781 A1 | 11/2006 | Yoon et al. |
| 2010/0035482 A1 | 2/2010 | Nakamura et al. |
| 2011/0064986 A1 | 3/2011 | Ogasawara et al. |
| 2011/0064987 A1 | 3/2011 | Ogasawara et al. |
| 2012/0164509 A1 | 6/2012 | Ogasawara et al. |
| 2012/0328920 A1* | 12/2012 | Takase ............... H01M 2/1077 429/90 |
| 2013/0071721 A1* | 3/2013 | Ogasawara ......... H01M 2/1077 429/151 |

FOREIGN PATENT DOCUMENTS

| | | | |
|---|---|---|---|
| EP | 2204863 | 7/2010 | |
| JP | 2000-149909 | 5/2000 | |
| JP | 2010-170884 | 8/2010 | |
| JP | 2010-225449 | 10/2010 | |
| JP | 2011-008955 | 1/2011 | |
| JP | 2011-008957 | 1/2011 | |
| JP | 2011-065863 | 3/2011 | |
| JP | 2011-067012 | 3/2011 | |
| JP | 2011-077031 | 4/2011 | |
| WO | WO 2011111678 A1 * | 9/2011 | .......... H01M 2/1077 |

OTHER PUBLICATIONS

Japan Office action and English language translation thereof, mail date is Feb. 17, 2015.
China Office action, dated Feb. 25, 2015 along with an English translation thereof.
Search report from PCT, mail date is Apr. 17, 2012.
Written Opinion of International Search Authority and English language translation thereof, mail date is Apr. 17, 2012.

* cited by examiner

BATTERY CONNECTING ASSEMBLY

TECHNICAL FIELD

The present invention relates to a battery connecting assembly.

BACKGROUND ART

A battery module that is used as a power source of an electric vehicle or a hybrid vehicle is disclosed in Patent Document 1. Such a battery module includes a plurality of batteries each having electrode terminals and adjacent electrode terminals are connected by a battery connecting assembly such that the batteries are connected in series or in parallel. The battery connecting assembly is configured with a plurality of connection units that are connected to each other. Each connection unit has a connection member that connects the adjacent electrode terminals.

[Patent Document 1] Japanese Unexamined Patent Publication No. 2011-8957

DISCLOSURE OF THE INVENTION

If a foreign obstacle comes in contact with the connection member or the electrode terminal, problems such as short circuit may be caused. In the related art, a cover is formed separately from the battery connecting assembly to cover the whole battery connecting assembly. Such a cover is provided to the battery module and a foreign obstacle may be less likely to be in contact with the connection member and the electrode terminals.

However, with the above configuration, if the number of batteries increases, the cover also increases in its size. This increases a size of a mold for molding the cover and this increases a cost of manufacturing the mold.

To solve the above problems, in the related art, the connection member cover that covers an area of the battery connecting assembly accommodating the connection member may be integrally provided with each connection unit. With this configuration, it is expected that a foreign obstacle is less likely to be in contact with the connection member or the electrode terminals due to the connection member cover. Further, if the number of batteries increases, the number of connection units can be also increased. Namely, one mold for molding one connection unit is manufactured, and a desired number of connection units can be molded with using the mold. It is not necessary to increase a size of the mold and the cost for manufacturing the mold may be less likely to increase.

However, with the above configuration, after the battery connecting assembly is attached to the batteries that are arranged, the connection member covers formed for every connection unit is necessary to be closed one by one to cover the connection members and the electrode terminals with the connection member cover. This closing work becomes extremely troublesome, as the number of batteries and connection units increases.

The present invention was accomplished in view of the foregoing circumstances. An object of the present invention is to provide a battery connecting assembly that reduces a manufacturing cost and simplifies a process of mounting the battery connecting assembly to batteries.

According to the present invention, a battery connecting assembly in a battery module connects batteries having electrode terminals. The batteries are aligned to configure a battery group. The battery connecting assembly includes a plurality of connection units in which a connecting member connecting the electrode terminals of adjacent batteries is arranged. Each of the connection units includes an accommodation portion in which the connecting member is arranged, a cover configured to cover the accommodation portion, and a hinge connecting the accommodation portion and the cover. The cover includes a cover stopper and a cover stopper receiver that is configured to fit to the cover stopper of an adjacent connection unit. Each of the connection units further includes a unit stopper, and a unit stopper receiver configured to fit to the unit stopper of the adjacent connection unit. The connection units are connected to each other such that the unit stoppers and the unit stopper receivers are fitted to each other and the covers of the connection units are connected to each other such that the cover stoppers and the cover stopper receivers are fitted to each other.

According to the present invention, the cover covers the accommodation portion, and therefore, the connecting member arranged in the accommodation portion and the electrode terminals connected to the connecting member are less likely to be in contact with any foreign obstacles.

According to the present invention, the connection unit integrally includes the cover. Therefore, if the number of batteries increases, the number of connection units to be connected can be also increased. Namely, only one mold for molding one connection unit is necessary to be manufactured to mold a predetermined number of connection units. Therefore, the mold is not necessary to be increased in size and a cost for manufacturing the mold is less likely to increase.

According to the present invention, the covers are connected to each other by fitting of the cover stoppers and the cover stopper receivers. With this configuration, after the battery connecting assembly is attached to the aligned batteries, the operation of closing the connected covers that configures one component is carried out only once to close the covers of the connection units and cover all of the accommodation portions of the connection units. This improves efficiency of assembling the battery connecting assembly to the batteries.

According to the present invention, a cost for manufacturing a battery connecting assembly is decreased, and a process of mounting the battery connecting assembly to a battery is simplified.

EXPLANATION OF SYMBOLS

Figure 1:
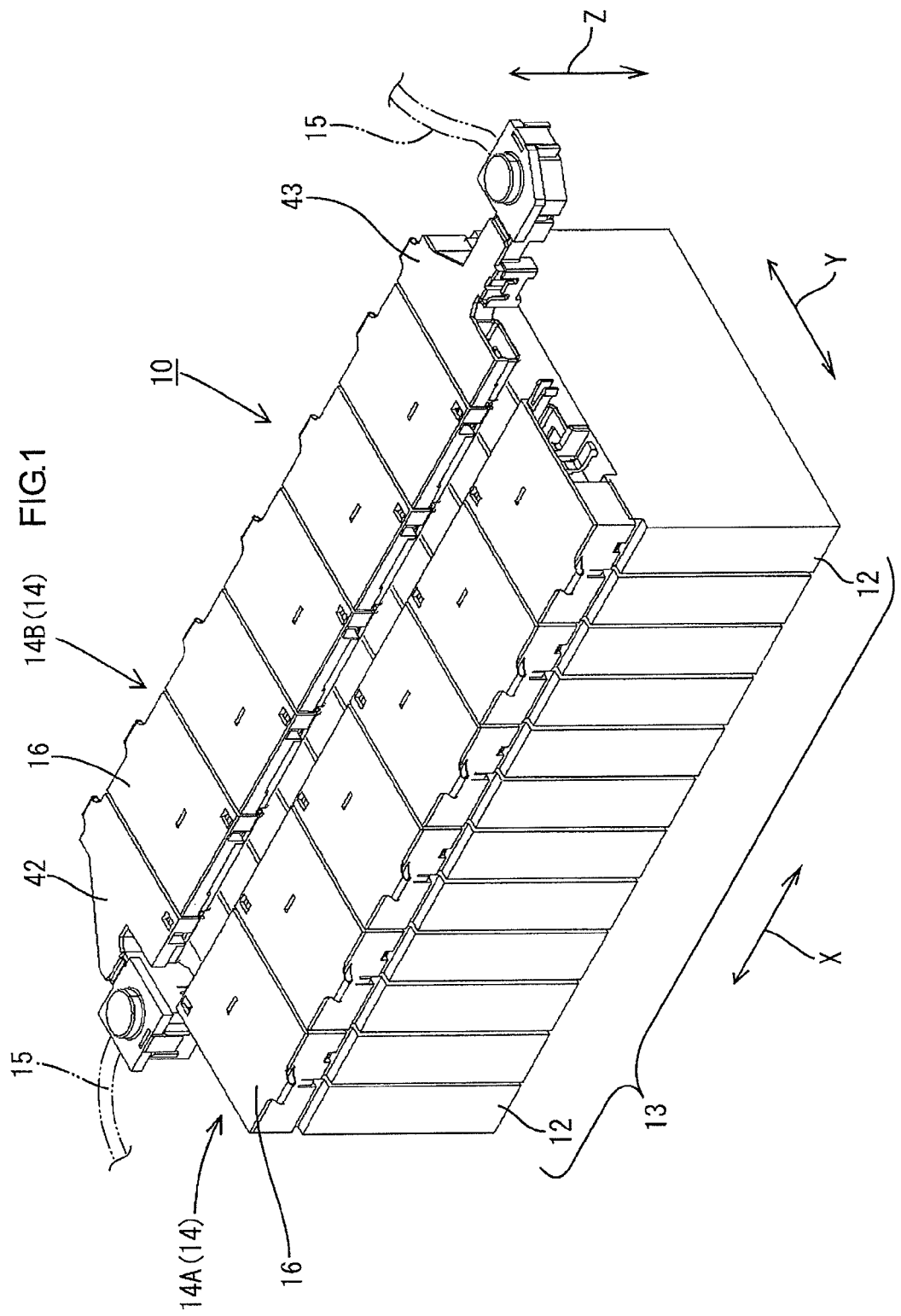
FIG. 1 is a perspective view illustrating a whole battery module according to a first embodiment.

10: Battery module
11: Electrode terminal
12: Battery
14A: Joint battery connecting assembly (Battery connecting assembly 14)
14B: External connection battery connecting assembly (Battery connecting assembly 14)
15: Power conductor
16: Connection unit
17: Connecting member
19: Accommodation portion
26: Hinge
27: Cover
30: Rib
31: Unit stopper
32: Unit stopper projection
33: Unit stopper receiver
34: Unit stopper hole
38: Cover stopper
39: Cover stopper projection
40: Cover stopper receiver
41: Cover stopper hole
42: First end side connection unit (End side connection unit)
43: Second end side connection unit (End side connection unit)
44: First end side connecting member (End side connecting member)
46: First end side connecting member accommodation portion (End side connecting member accommodation portion)
47: First end side cover (End side cover)
48A, 48B: Main hinge
49A, 49B: Auxiliary hinge
52: First end side rib (End side rib)
53: First end side unit stopper receiver (End side unit stopper receiver)
54: First end portion unit stopper hole (End portion unit stopper hole)
56: First end side cover stopper receiver (End side cover stopper receiver)
57: First end side cover stopper hole (End side cover stopper hole)
58: Second end side connecting member (End side connecting member)
59: Second end side connecting member accommodating portion (End side connecting member accommodating portion)
60: Second end side cover (End side cover)
65: Second end side rib (End side rib)
66: Second end side unit stopper (End side unit stopper)
67: Second end side unit stopper projection (End side unit stopper projection)
69: Second end side cover stopper (End side cover stopper)
70: Second end side cover stopper projection (End side cover stopper projection)
80: Battery connecting assembly
81: Connection unit
82: Connecting member
83: Accommodation portion
84: Voltage detection terminal (Detection terminal)
85: Wire arrangement portion
86: Wiring cover hinge
87: Wiring cover
88: Overlap portion
89: Cover
90: Water stop rib

BEST MODES FOR CARRYING OUT THE INVENTION

First Embodiment

A first embodiment of the present invention will be explained with reference to FIGS. 1 to 22. In the first embodiment, the present invention is applied to a battery module 10. The battery module of the present embodiment is mounted to a vehicle such as an electric vehicle or a hybrid vehicle (not illustrated) and used as a power source that drives the vehicle. The battery module 10 has a battery group 13 including a plurality of batteries 12 (twelve in the present embodiment) each of which has electrode terminals 11. The batteries 12 included in the battery group 13 are electrically connected to each other by a battery connecting assembly 14.

In the following description, a direction designated by an arrow X in FIG. 1 is a right-left direction. Specifically, a side close to a right front side in FIG. 1 is a right side and a side close to a left rear side in FIG. 1 is a left side. A direction designated by an arrow Y in FIG. 1 is a front-rear direction. Specifically, a side close to a left front side is a front side and a side close to a right rear side is a rear side. A direction designated by an arrow Z in FIG. 1 is an up-down direction. Specifically, a lower side in FIG. 1 is a lower side and an upper side in FIG. 1 is an upper side.

In the following description, a reference number may be applied to a component in only one of several drawings and the reference number of the same component may be omitted in other drawings.

(Battery 12)

The battery 12 is formed in a flat rectangular parallelepiped. The battery 12 houses power generation components (not illustrated) therein. A pair of electrode terminals 11 is formed on an upper surface of the battery 12 so as to project upwardly. The two electrode terminals 11 are provided adjacent to end portions of the upper surface of the battery 12 in the front-rear direction, respectively. One of the electrode terminals 11 is a positive terminal and another one is a negative terminal. A screw thread is formed on an outer surface of the electrode terminal 11. The batteries 12 are arranged such that the adjacent electrode terminals 11 have different poles. The batteries 12 are arranged in the right-left direction to configure the battery group 13.

(Battery Connecting Assembly 14)

The battery connecting assembly 14 that connects the adjacent batteries 12 that are arranged on the front side in FIG. 1 are a joint battery connecting assembly 14A. The battery connecting assembly 14 that is arranged on the front side in FIG. 1 is a joint battery connecting assembly 14A. The battery connecting assembly 14 that is arranged on the rear side in FIG. 1 and connects the battery group 13 to a power conductor 15 mounted in a vehicle is an external connection battery connecting assembly 14B. Any conductors may be used as the power conductor 15 such as an electric wire or a bus bar, as necessary.

(Joint Battery Connecting Assembly 14A)

Figure 2:
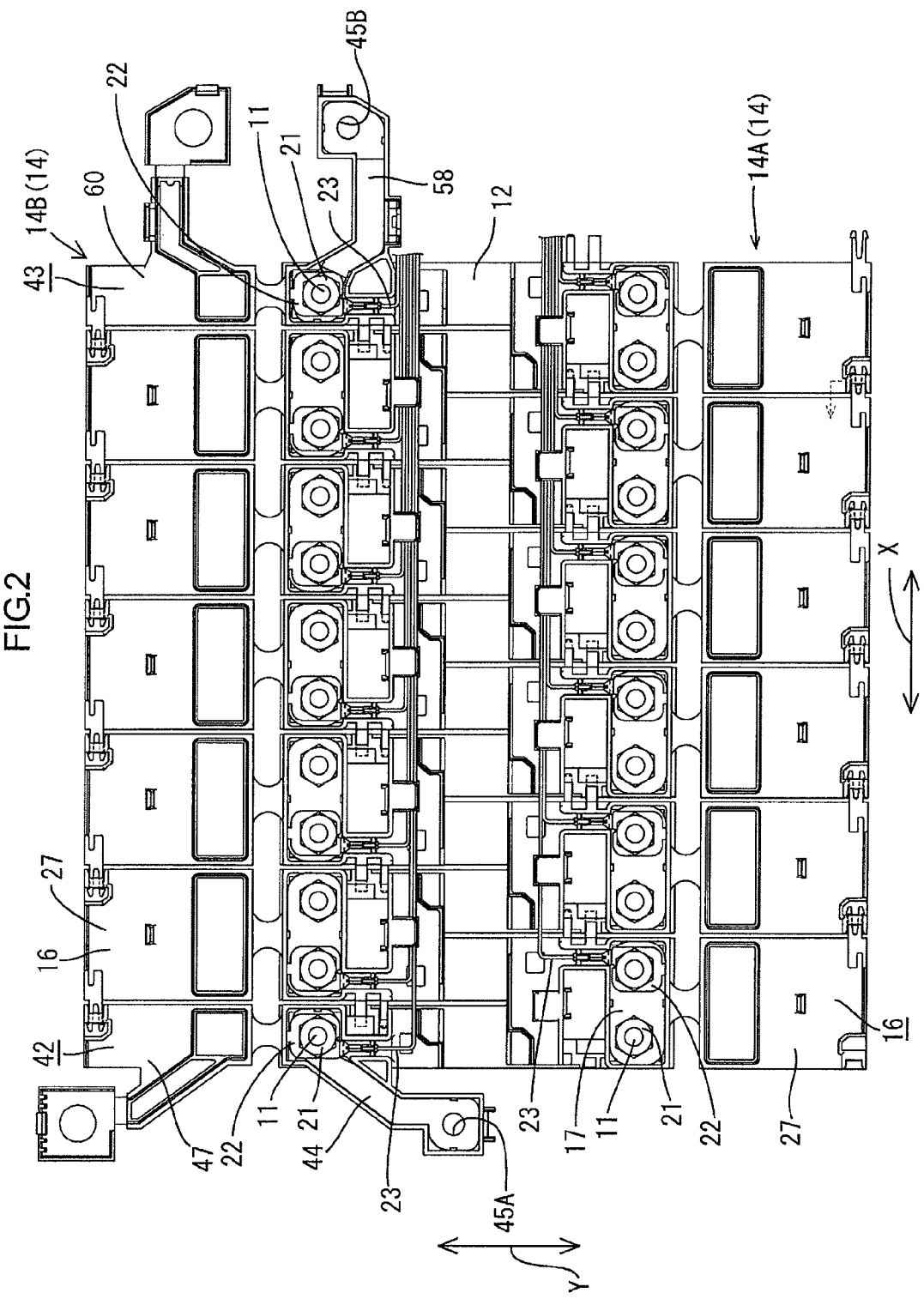
FIG. 2 is a plan view illustrating the battery module where a cover, a first end portion cover and a second end portion cover are open.

As illustrated in FIG. 2, the joint battery connecting assembly 14A includes a plurality of (six in the present embodiment) connection units 16 that are connected to each other in the right-left direction. The connection units 16 are arranged in a direction that matches a direction in which the batteries 12 of the battery group 13 are arranged.

(Connection Unit 16)

The connection unit 16 includes a connecting member 17 that connects the electrode terminals 11 of the adjacent batteries 12. The connecting member 17 is formed by pressing a metal plate made of copper, copper alloy or SUS into a predetermined shape. The connecting member 17 is formed in a rectangular shape having a longitudinal side along the right-left direction viewed from the above. The connecting member 17 has electrode terminal through holes 18A penetrating therethrough and the electrode terminal 11 is passed through the corresponding electrode terminal through hole 18A.

The connection unit 16 has an accommodation portion 19 made of synthetic resin and accommodating the connecting member therein. The accommodation portion 19 is formed in a rectangular shape viewed from the above and in a size greater than the connecting member 17. The accommodation portion 19 has an opening 20A that is open upwardly and the connecting member 17 is accommodated in the accommodation portion 19 through the opening 20A.

The electrode terminal 11 is passed through the electrode terminal through hole 18A of the connecting member 17 and a nut 21 is screwed thereto and the electrode terminal 11 is electrically connected to the connecting member 17. In one of the adjacent electrode terminals 11 that are connected by the connecting member 17, a voltage detection terminal 22 is provided between the nut 21 and the connecting member 17. Accordingly, the voltage detection terminal 22 is electrically connected to the electrode terminal 11. One end of a voltage detection line 23 is connected to the voltage detection terminal 22 by a known method such as crimping. Another end of the voltage detection line 23 is connected to an ECU (not illustrated).

The connection unit 16 includes a wire arrangement portion 24A made of synthetic resin in which the voltage detection line 23 is arranged along the right-left direction. The wire arrangement portion 24A is formed in substantially a recess viewed from a right or left side so as to accommodate the voltage detection line 23 therein. The wire arrangement portion 24A and the accommodation portion 19 are connected to each other by a joint 25A made of synthetic resin. The voltage detection terminal 22 is held by the joint 25A.

A cover 27 made of synthetic resin is formed integrally with the accommodation portion 19 via a hinge 26. The cover 27 is provided on a side of the accommodation portion 19 opposite to a side close to the joint 25. The cover 27 is movable around the hinge 26. The cover 27 is formed in substantially a rectangular shape viewed from the above. The cover 27 has a size that can cover the accommodation portion 19, the joint 25A and the wire arrangement portion 24A. A cover lock 28 formed on the cover 27 is elastically fitted to a cover lock receiver 29 formed on the wire arrangement portion 24. Thereby, the cover 27 covers the accommodation portion 19, the joint 25A and the wire arrangement portion 24A and maintains its state.

A rib 30 is formed on a surface of the cover 27 that faces the accommodation portion 19 in its closed state. The rib 30 is formed to project toward the accommodation portion 19 in the closed state of the cover 27. The rib 30 is formed in substantially a rectangular closed loop shape. The rib 30 is fitted in a space of the accommodation portion 19 in the closed state of the cover 27. Specifically, the rib 30 is formed in a rectangular closed loop shape that is smaller than a shape of an opening edge of the opening 20A.

(Joint Structure of Connection Units 16)

Figure 3:
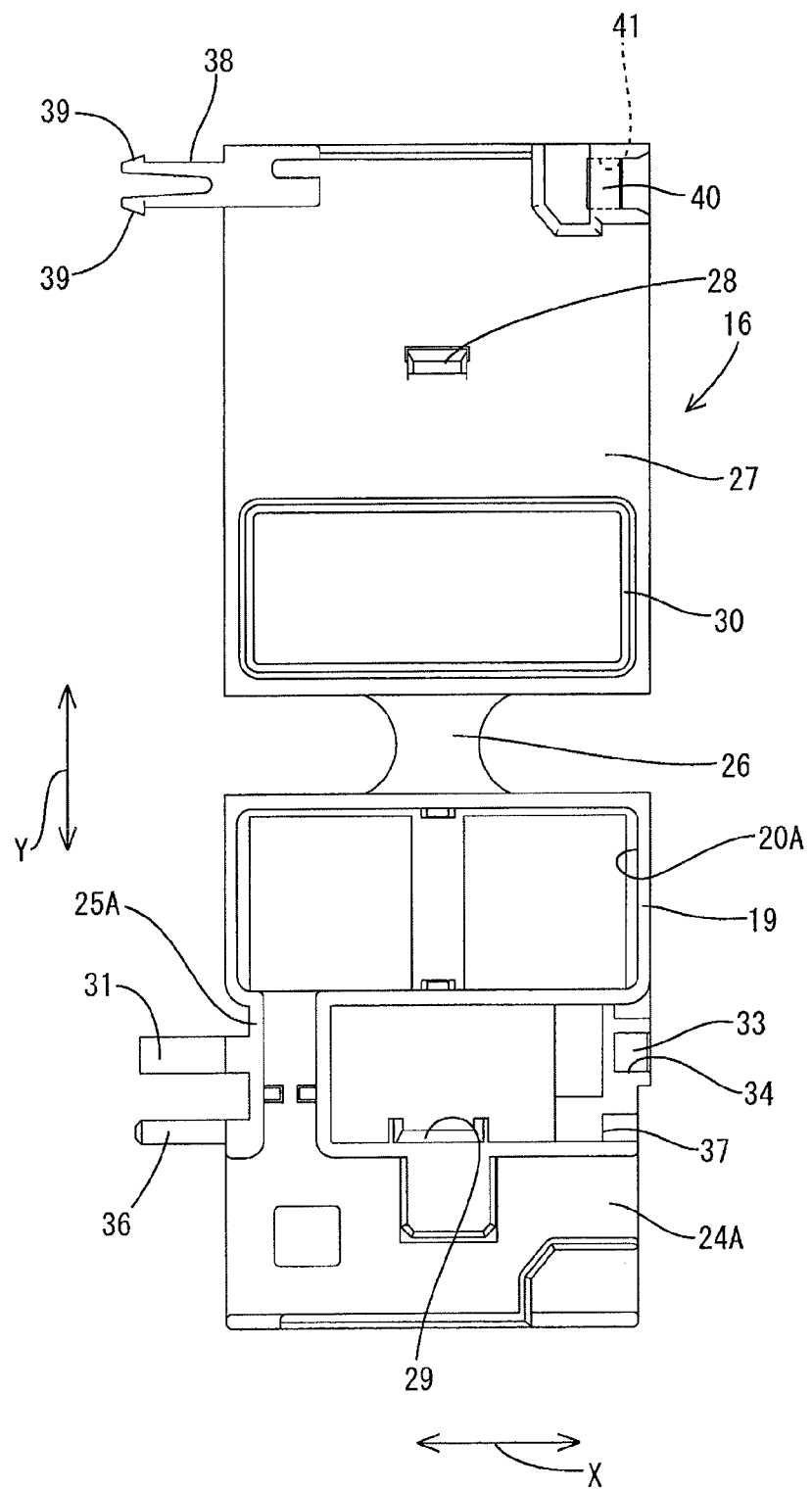
FIG. 3 is a plan view illustrating a connection unit.
Figure 4:
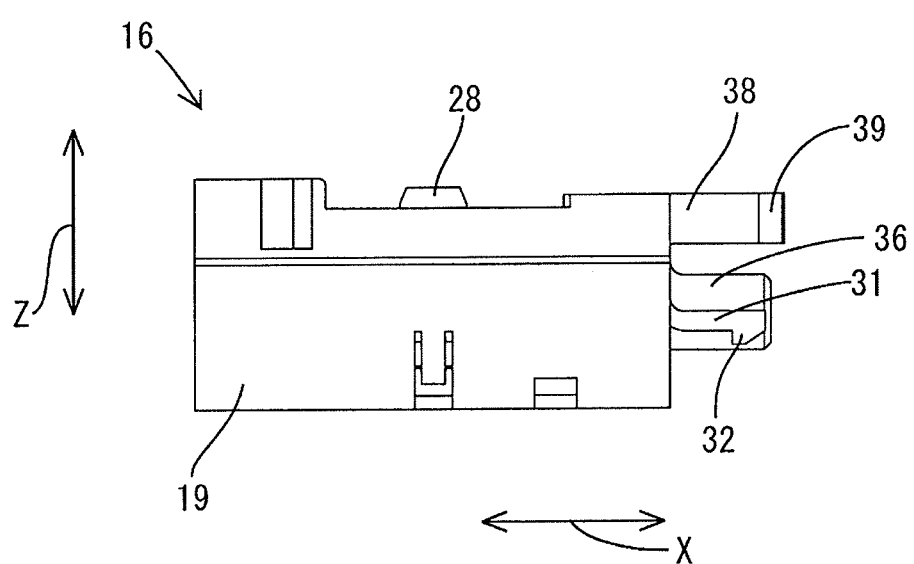
FIG. 4 is a rear view illustrating the connection unit.

As illustrated in FIG. 3, a unit stopper 31 is formed on one of a right and a left side end of the connection unit 16 so as to project outwardly from the one side end. As illustrated in FIG. 4, a unit stopper projection 32 is formed at a distal end of the unit stopper 31 so as to project downwardly.

Figure 6:
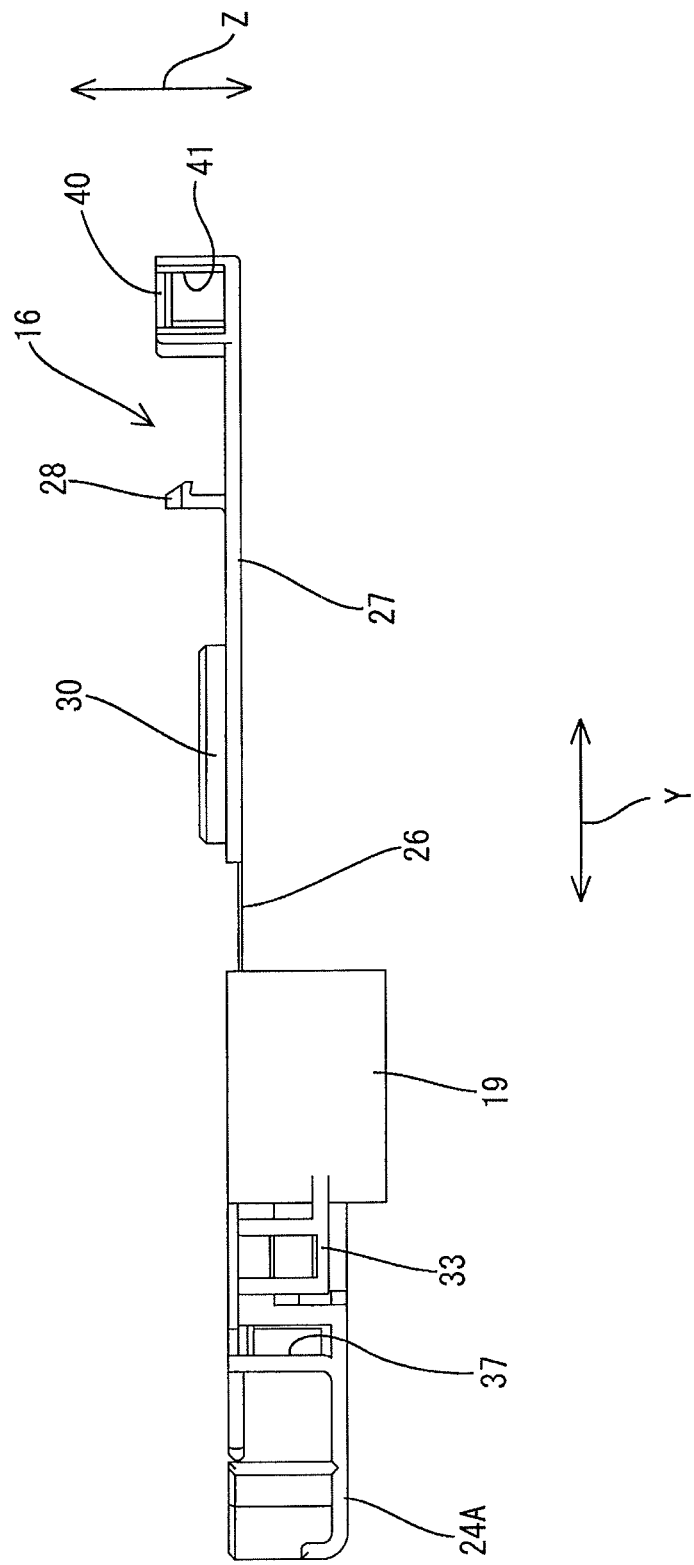
FIG. 6 is a side view illustrating the connection unit.

As illustrated in FIGS. 3 and 6, a unit stopper receiver 33 is formed on another side end of the connection unit 16 that is opposite to the one side end on which the unit stopper 31 is formed. The unit stopper 31 is fitted to the unit stopper receiver 33. Unit stopper holes 34 are formed in the unit stopper receiver 33 so as to penetrate therethrough in the right-left direction. The unit stopper projection 32 passes through the unit stopper hole 23.

Figure 7:
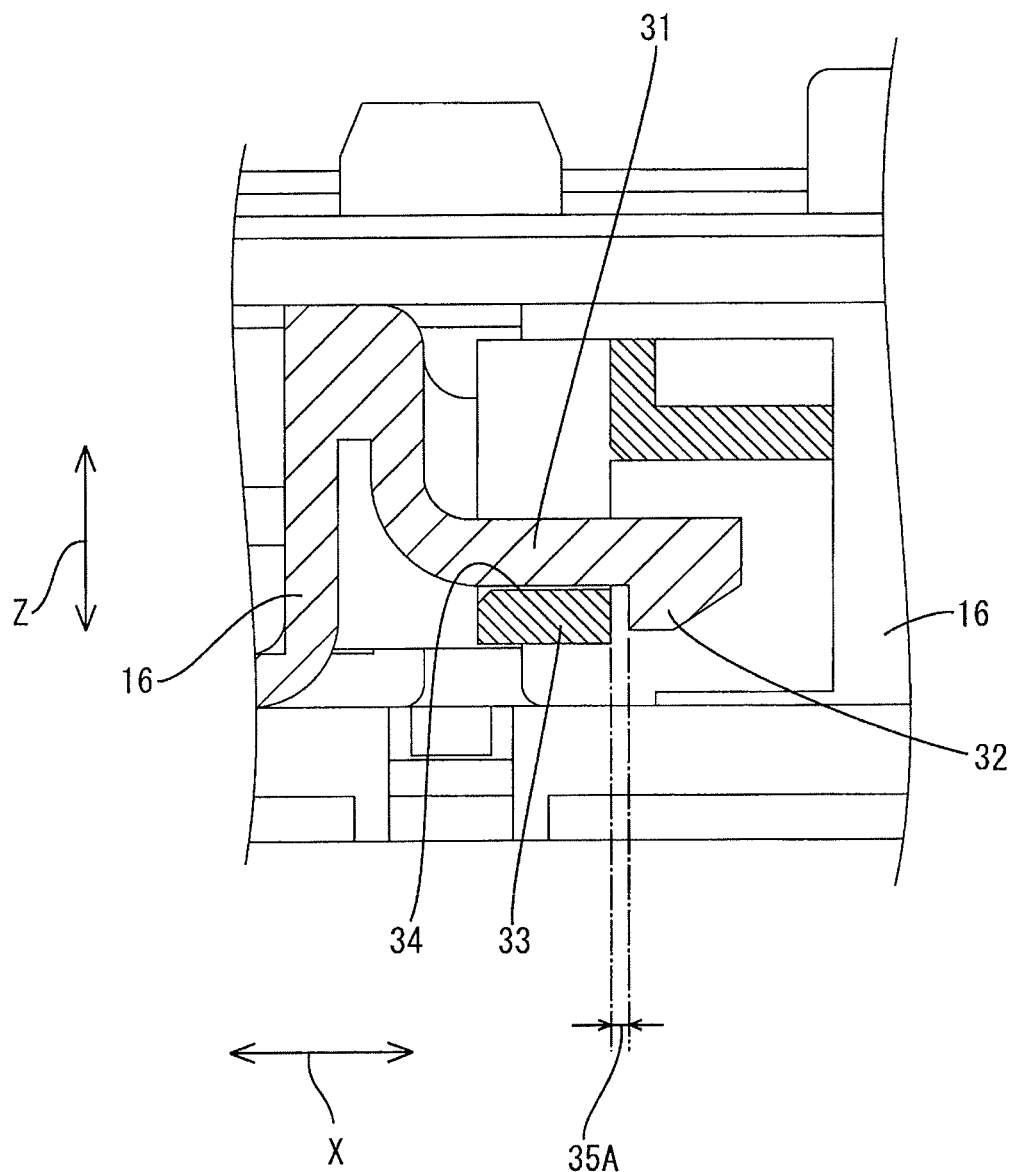
FIG. 7 is a cross-sectional view taken along a VII-VII line in FIG. 16.

As illustrated in FIG. 7, the unit stopper projection 32 passes through the unit stopper hole 34 and comes in contact with an opening edge of the unit stopper hole 34 from a front side in the penetrating direction in which the unit stopper projection 32 passes through the unit stopper hole 34. A predetermined clearance 35A is formed between the opening edge of the unit stopper hole 34 and the unit stopper projection 32. The predetermined clearance 35A corresponds to a clearance that is formed between an opening edge of a stopper hole and a stopper projection in a general stopper mechanism in which the stopper projection is stopped by an opening edge of the stopper hole. If such a clearance 35A is not provided, the stopper projection may not be stopped by the opening edge of the stopper hole due to a small dimension error. In the present embodiment, the clearance 35A formed between the opening edge of the unit stopper hole 34 and the unit stopper projection is 0.2 mm. A dimension range of the clearance 35A may be set to an arbitrary range as necessary.

Figure 5:
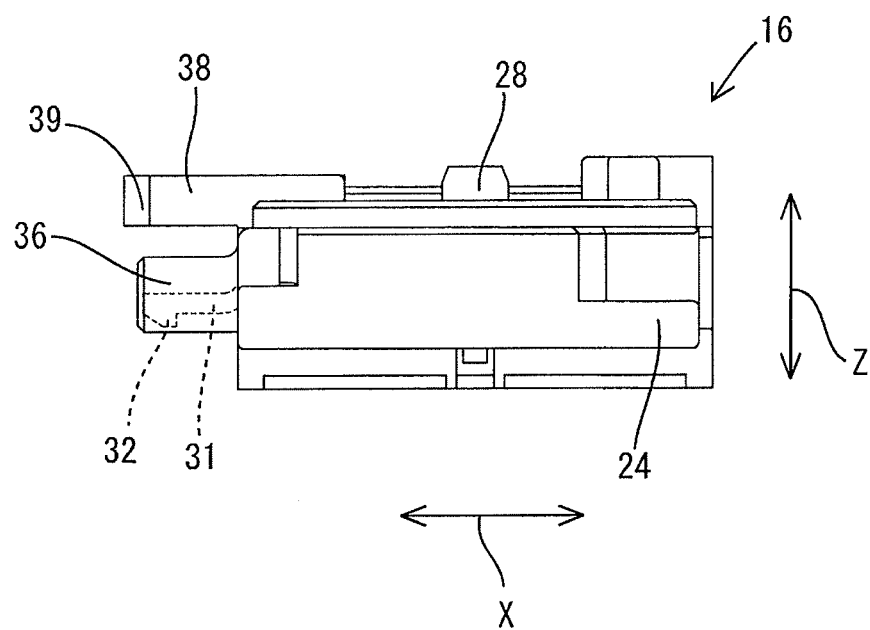
FIG. 5 is a front view illustrating the connection unit.

As illustrated in FIG. 3, a guide 36 is formed on a side end of the connection unit 16 on which the unit stopper 31 is formed. The guide 36 is arranged adjacent to the unit stopper 31 in the front-rear direction (the direction Y in FIG. 3) and projects outwardly. As illustrated in FIGS. 3 and 5, the guide 36 is formed in a flat plate in the front-rear direction (the direction Y in FIG. 3).

As illustrated in FIGS. 3 and 6, a guide receiver 37 is formed on a side end of the connection unit 16 that is opposite to the side end on which the guide 36 is formed. The guide 36 is fitted to the guide receiver 37. The guide receiver 37 is a through hole through which the guide 36 passes in the right-left direction.

(Fitting Configuration of Cover 27)

As illustrated in FIG. 3, a cover stopper 38 is formed on one of right and left side ends of the cover 27. The cover stopper 38 projects outwardly from the side end. The cover stopper 38 is formed to be branched into two and a cover stopper projection 39 is formed at each of the two branched distal ends. The stopper projection 39 projects outwardly in the front-rear direction (in the direction Y in FIG. 3).

As illustrated in FIGS. 3 and 6, a cover stopper receiver 40 is formed on a side end that is opposite to the side end on which the cover stopper 38 is formed. The cover stopper 38 is fitted to the cover stopper receiver 40. A cover stopper hole 41 is formed in the cover stopper receiver 40 so as to penetrate therethrough in the right-left direction. The cover stopper projection 39 is passed through the cover stopper hole 41.

Figure 8:
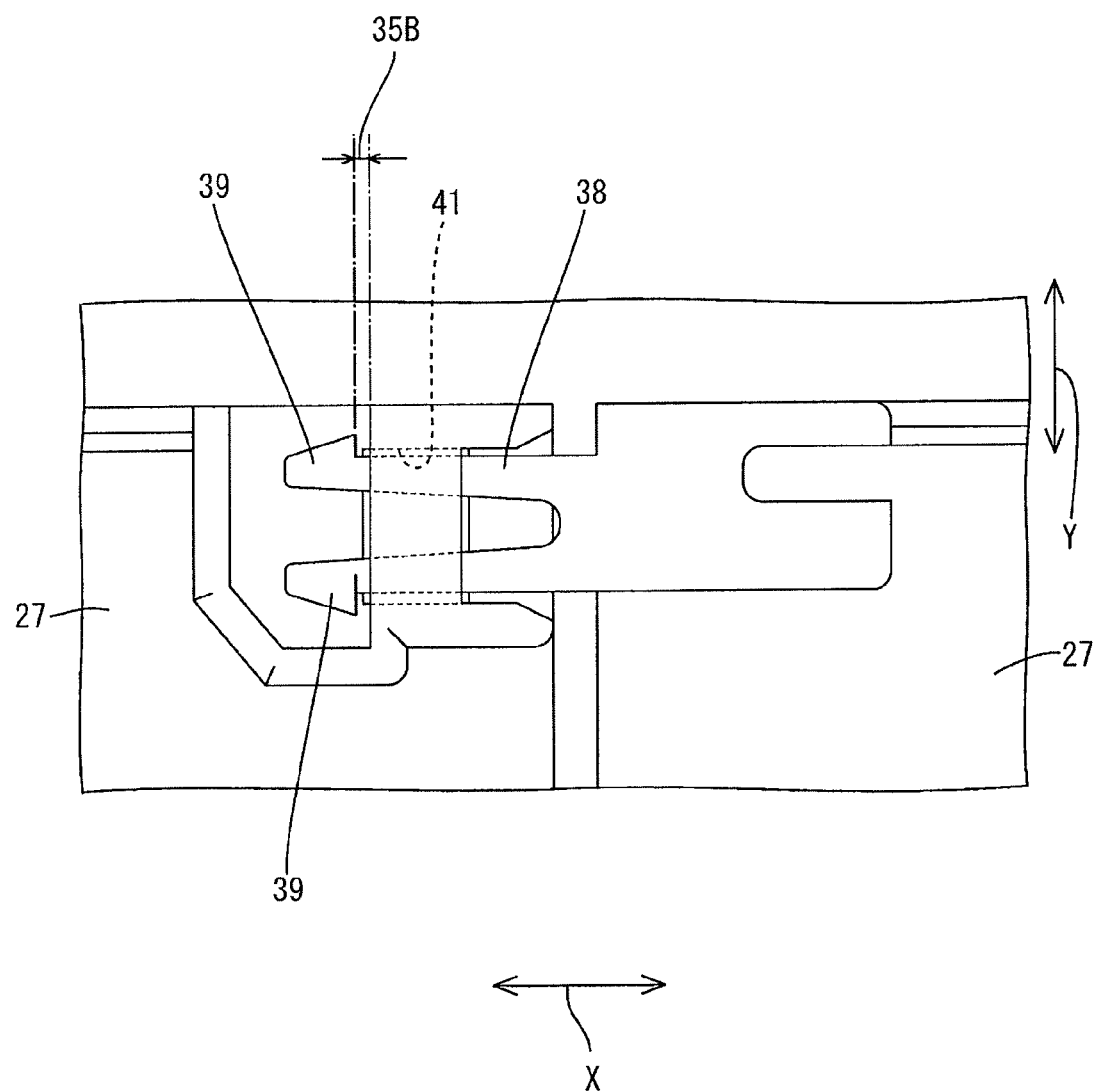
FIG. 8 is an enlarged plan view illustrating a part of a stopper configuration of a cover stopper and a cover stopper receiver.

As illustrated in FIG. 8, the cover stopper projection 39 is fitted through the cover stopper hole 41 and in contact with an opening edge of the cover stopper hole 41 from a front side in the direction in which the cover stopper projection 39 passes through the cover stopper hole 41. A predetermined clearance 35B is provided between an opening edge of the cover stopper hole 41 and the cover stopper projection 39. The predetermined clearance 35B corresponds to a clearance that is formed between an opening edge of a stopper hole and a stopper projection in a general stopper mechanism in which the stopper projection is stopped by an opening edge of the stopper hole. If such a clearance 35B is not provided, the stopper projection may not be stopped by the opening edge of the stopper hole due to a small dimension error. In the present embodiment, the clearance 35B formed between the opening edge of the cover stopper hole 41 and the cover stopper projection 27 is 0.2 mm. A dimension range of the clearance 35B may be set to an arbitrary range as necessary.

As illustrated in FIG. 2, with the configuration in which the unit stopper 31 is fitted to the unit stopper receiver 33 and the configuration in which the cover stopper 38 is fitted to the cover stopper receiver 40, the connection units 16 are connected to each other in the right-left direction to configure the joint battery connecting assembly 14A.

In the present embodiment, the unit stopper 31 and the unit stopper receiver 33 are fitted to each other in the right-left direction. The cover stopper 38 and the cover stopper receiver 40 are fitted to each other in the right-left direction. Namely, the direction in which the unit stopper 31 and the unit stopper receiver 33 are fitted to each other matches the direction in which the cover stopper 38 and the cover stopper receiver 40 are fitted to each other.

(External Connection Battery Connecting Assembly 14B)

The external connection battery connecting assembly 14B that is arranged on the rear side in FIG. 2 includes a plurality of (five in the present embodiment) connection units 16, a first end side connection unit 42 and a second end side connection unit 43. The first end side connection unit 42 is connected to a left side end of the connected connection units 16, and the second end side connection unit 43 is connected to a right side end of the connected connection units 16. The first end side connection unit 42, the connection units 16, and the second end side connection units 43 are arranged in a direction that matches a direction in which the batteries 12 of the battery group 13 are arranged.

(First End Side Connection Unit 42)

As illustrated in FIG. 2, the first end side connection unit 42 includes a first end side connecting member 44 that connects the rear-side electrode terminal 11 of the battery 12 located on the left side end of the battery group 13 and the power conductor 15 mounted in the vehicle. The first end side connecting member 44 is formed by pressing a metal plate such as copper, copper alloy or SUS into a predetermined shape. The first end side connecting member 44 is formed in an elongated bent shape extending in the up-down direction viewed from the above. An electrode terminal through hole 18B is formed in a rear end portion of the first end side connecting member 44. The electrode terminal 11 is fitted through the electrode terminal through hole 18B. A bolt through hole 45A is formed in a front end portion of the first end side connecting member 44. A bolt (not illustrated) is passed through the bolt through hole 45A. The bolt inserted through the bolt through hole 45A and a nut are screwed together, and accordingly, the first end side connecting member 44 and the power conductor 15 are fixed to each other between a head of the bolt and the nut.

The first end side connection unit 42 includes a first end side connecting member accommodation portion 46 in which the first end side connecting member 44 is accommodated. The first end side connecting member accommodation portion 46 is made of synthetic resin. The first end side connecting member accommodation portion 46 is formed to follow the shape of the first end side connecting member 44 viewed from the above and greater than the first end side connecting member 44. The first end side connecting member accommodation portion 46 has an opening 20B that is open upwardly. The first end side connecting member 44 is put in the first end side connecting member accommodation portion 46 through the opening 20B.

The electrode terminal 11 that is fitted through the electrode terminal through hole 18B of the first end side connecting member 44 is screwed with the nut 21 and accordingly, the electrode terminal 11 and the first end side connecting member 44 are electrically connected to each other. The voltage detection terminal 22 is provided between the nut 21 and the first end side connecting member 44 and accordingly, the voltage detection terminal 22 and the electrode terminal 11 are electrically connected to each other. One of the ends of the voltage detection line 23 is connected to the voltage detection terminal 22 by a known method such as crimping. Another end of the voltage detection line 23 is connected to the ECU (not illustrated).

The first end side connection unit 42 includes a wire arrangement portion 24B made of synthetic resin in which the voltage detection line 23 is arranged along the right-left direction. The wire arrangement portion 24B is formed in substantially a recess viewed from a right or left side so as to accommodate the voltage detection line 23 therein. The wire arrangement portion 24B and the first end side connecting member accommodation portion 46 are connected to each other by a joint 25B made of synthetic resin. The voltage detection terminal 22 is held by the joint 25B.

A first end side cover 47 made of synthetic resin is formed integrally with the first end side connecting member accommodation portion 46 via a main hinge 48A. The first end side cover 47 is provided on a side of the first end side connecting member accommodation portion 46 opposite to a side close to the joint 25S. The first end side cover 47 is movable around the main hinge 48A. The first end side cover 47 is formed to substantially follow an outer shape of the first end side connecting member accommodation portion 46, the joint 25B, and the wire arrangement portion 24B viewed from the above. The first end side cover 47 has a size that can cover the first end side connecting member accommodation portion 46, the joint 25B and the wire arrangement portion 24B.

The first end side cover 47 further includes an auxiliary hinge 49A. The first end side cover 47 is movable around the auxiliary hinge 49A. A portion of the first end side cover 47 that corresponds to a connecting portion in which the first end side connecting member 44 is connected to the power conductor 15 is opened and closed via the auxiliary hinge 49A.

Figure 10:
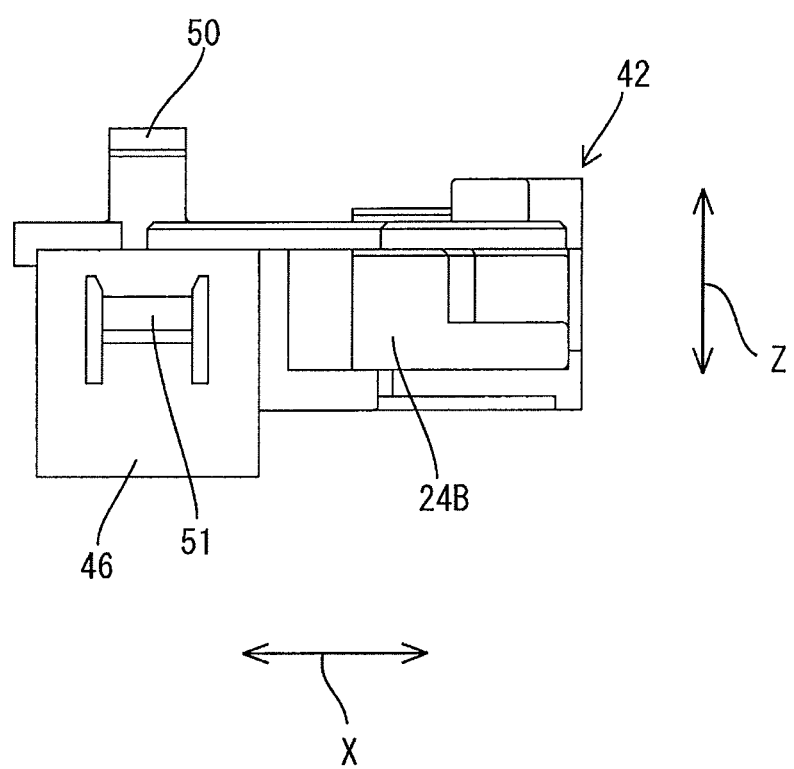
FIG. 10 is a front view illustrating the first end side connection unit.

As illustrated in FIG. 10, a first end side cover lock 50 formed on the first end side cover 47 is elastically fitted to a first end side cover lock receiver 51 formed on the first end side connecting member accommodation portion 46. Thereby, the first end side cover 47 covers the first end side connecting member accommodation portion 46, the joint 25B and the wire arrangement portion 24B and maintains its state.

A first end side rib 52 is formed on a surface of the first end side cover 47 that faces the first end side connecting member accommodation portion 46 in its closed state. The first end side rib 52 is formed to project toward the first end side connecting member accommodation portion 46 in the closed state of the first end side cover 47. The first end side rib 52 is formed to be fitted in a space of the first end side connecting member accommodation portion 46 in the closed state of the first end side cover 27.

(Fitting Configuration of First End Side Connection Unit 42)

Figure 9:
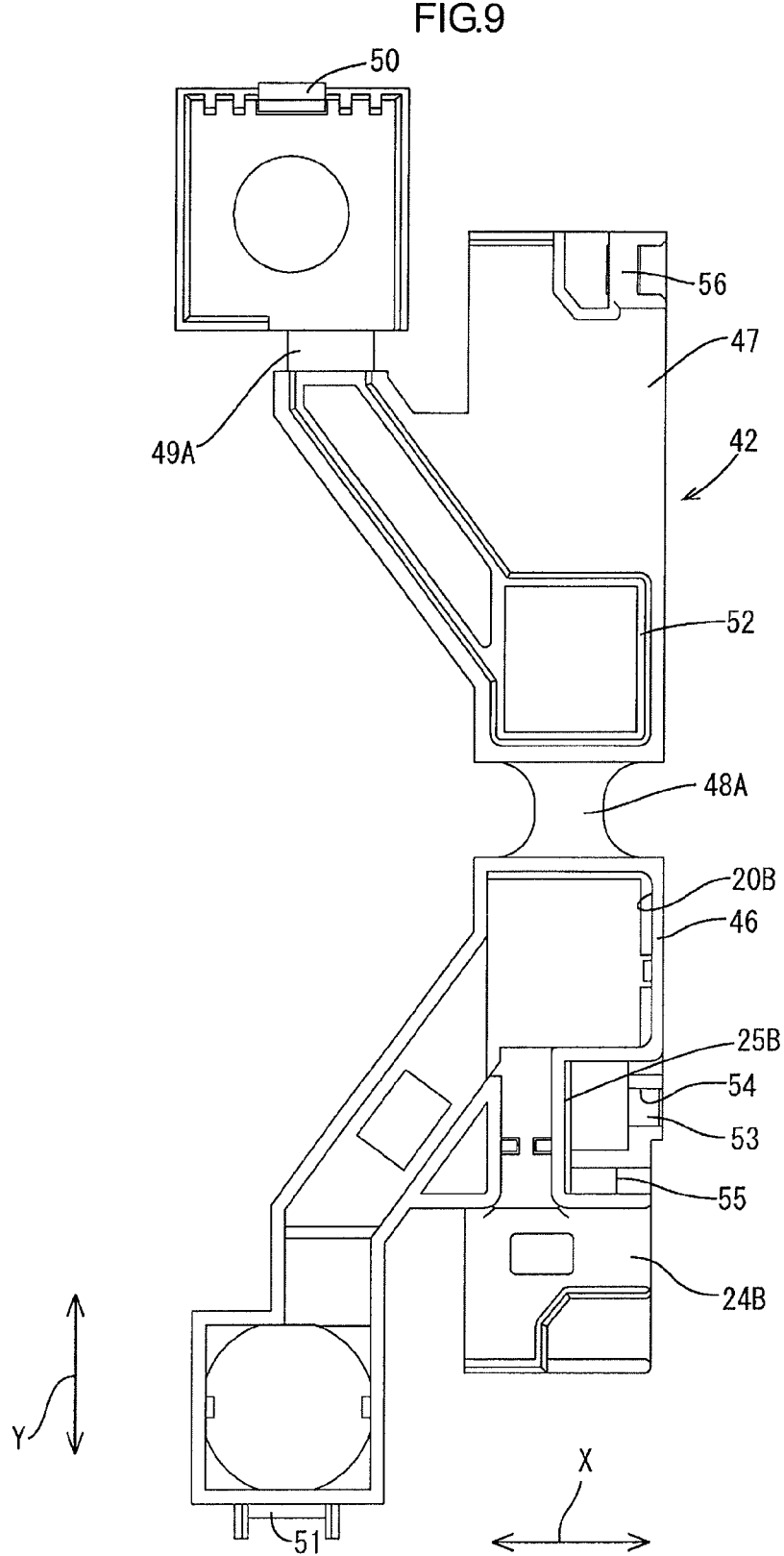
FIG. 9 is a plan view illustrating a first end side connection unit.

As illustrated in FIG. 9, a first end side unit stopper receiver 53 is formed on a right side end of the first end side connection unit 42. The unit stopper 31 of the connection unit 16 that is arranged on the right side of the first end side connection unit 42 is fitted to the first end side unit stopper receiver 53.

Figure 11:
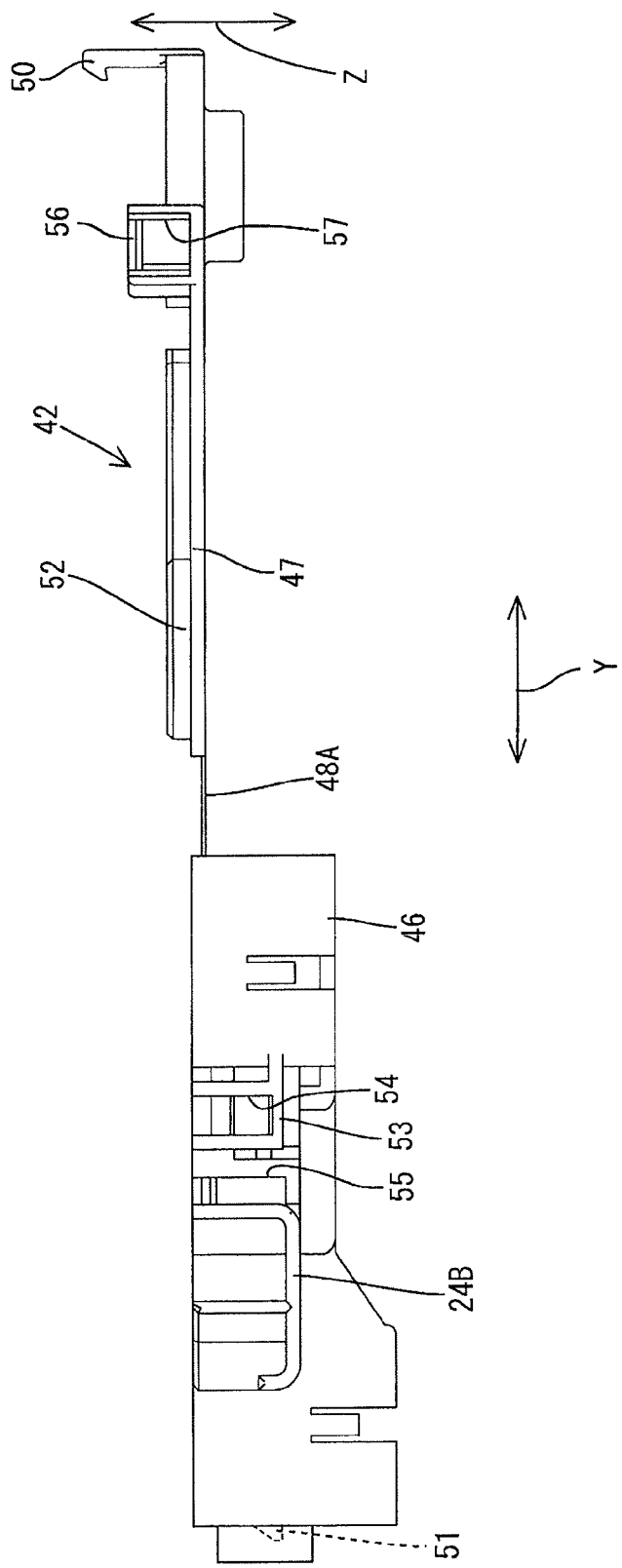
FIG. 11 is a side view illustrating the first end side connection unit.

As illustrated in FIGS. 9 and 11, a first end side unit stopper hole 54 is formed through the first end side unit stopper receiver 53 in the right-left direction. The unit stopper projection 32 is fitted through the first end side unit stopper hole 54.

The fitting configuration of the unit stopper 31 and the first end side unit stopper receiver 53 is substantially same as the fitting configuration of the unit stopper 31 and the unit stopper receiver 33 illustrated in FIG. 7, and explanation thereof will be omitted.

As illustrated in FIGS. 9 and 11, a first end side guide receiver 55 is formed on a right end of the first end side connection unit 42. The guide 36 of the connection unit 16 that is arranged on the right side of the first end side connection unit 42 is fitted to the first end side guide receiver 55. The first end side guide receiver 55 is a through hole passing through in the right-left direction and the guide 36 is fitted through the first end side guide receiver 55.

(Fitting Configuration of First End Side Cover 47)

As illustrated in FIGS. 9 and 11, a first end side cover stopper receiver 56 is formed on a right end of the first end side connection unit 42. The cover stopper 38 formed on the cover 27 of the connection unit 16 that is arranged on the right side of the first end side connection unit 42 is fitted to the first end side cover stopper receiver 56. A first end side cover stopper hole 57 is formed through the first end side cover stopper receiver 56 in the right-left direction. The cover stopper projection 39 is fitted through the first end side cover stopper hole 56.

The fitting configuration of the cover stopper 38 and the first end side cover stopper receiver 56 is substantially same as the fitting configuration of the cover stopper 38 and the cover stopper receiver 40 illustrated in FIG. 8, and explanation thereof will be omitted.

As illustrated in FIG. 2, the first end side connection unit 42 is connected to the left end portion of the connection units 16 that are connected to each other. Specifically, with the configuration in which the unit stopper 31 is fitted to the first end side unit stopper receiver 53 and the configuration in which the cover stopper 38 is fitted to the first end side cover stopper receiver 56, the first end side connection unit 42 is connected to the connection unit 16.

In the present embodiment, the unit stopper 31 and the first end side unit stopper receiver 53 are fitted to each other in the right-left direction. The cover stopper 38 and the first end side cover stopper receiver 56 are fitted to each other in the right-left direction. Namely, the direction in which the unit stopper 31 and the first end side unit stopper receiver 53 are fitted to each other matches the direction in which the cover stopper 38 and the first end side cover stopper receiver 56 are fitted to each other.

(Second End Side Connection Unit 43)

As illustrated in FIG. 2, the second end side connection unit 43 includes a second end side connecting member 58 that connects the rear-side electrode terminal 11 of the battery 12 located on the right side end of the battery group 13 and the power conductor 15 mounted in the vehicle. The second end side connecting member 58 is formed by pressing a metal plate such as copper, copper alloy or SUS into a predetermined shape. The second end side connecting member 58 is formed in an elongated bent shape extending in the right-left direction viewed from the above. An electrode terminal through hole 18C is formed in a left end portion of the second end side connecting member 58. The electrode terminal 11 is fitted through the electrode terminal through hole 18C. A bolt through hole 45B is formed in a right end portion of the second end side connecting member 58. A bolt (not illustrated) is passed through the bolt through hole 45B. The bolt inserted through the bolt through hole 45B and a nut are screwed together, and accordingly, the second end side connecting member 58 and the power conductor 15 are fixed to each other between a head of the bolt and the nut.

The second end side connection unit 43 includes a second end side connecting member accommodation portion 59 in which the second end side connecting member 58 is accommodated. The second end side connecting member accommodation portion 59 is made of synthetic resin. The second end side connecting member accommodation portion 59 is formed to follow the shape of the second end side connecting member 58 viewed from the above and to be greater than the second end side connecting member 58. The second end side connecting member accommodation portion 59 has an opening 20C that is open upwardly. The second end side connecting member 58 is put in the second end side connecting member accommodation portion 59 through the opening 20C.

The electrode terminal 11 that is fitted through the electrode terminal through hole 18C of the second end side connecting member 58 is screwed with the nut 21 and accordingly, the electrode terminal 11 and the second end side connecting member 58 are electrically connected to each other. The voltage detection terminal 22 is provided between the nut 21 and the second end side connecting member 58 and accordingly, the voltage detection terminal 22 and the electrode terminal 11 are electrically connected to each other. One of the ends of the voltage detection line 23 is connected to the voltage detection terminal 22 by a known method such as crimping. Another end of the voltage detection line 23 is connected to the ECU (not illustrated).

The second end side connection unit 43 includes a wire arrangement portion 24C made of synthetic resin in which the voltage detection line 23 is arranged along the right-left direction. The wire arrangement portion 24C is formed in substantially a recess viewed from a right or left side so as to accommodate the voltage detection line 23 therein. The wire arrangement portion 24C and the second end side connecting member accommodation portion 59 are connected to each other by a joint 25C made of synthetic resin. The voltage detection terminal 22 is held by the joint 25C.

A second end side cover 60 made of synthetic resin is formed integrally with the second end side connecting member accommodation portion 59 via a main hinge 48B. The second end side cover 60 is provided on a side of the second end side connecting member accommodation portion 59 opposite to a side close to the joint 25C. The second end side cover 60 is movable around the main hinge 48B. The second end side cover 60 is formed to substantially follow the shapes of the second end side connecting member accommodation portion 59, the joint 25C, and the wire arrangement portion 24C viewed from the above. The second end side cover 60 has a size that can cover the second end side connecting member accommodation portion 59, the joint 25C and the wire arrangement portion 24C.

Figure 14:
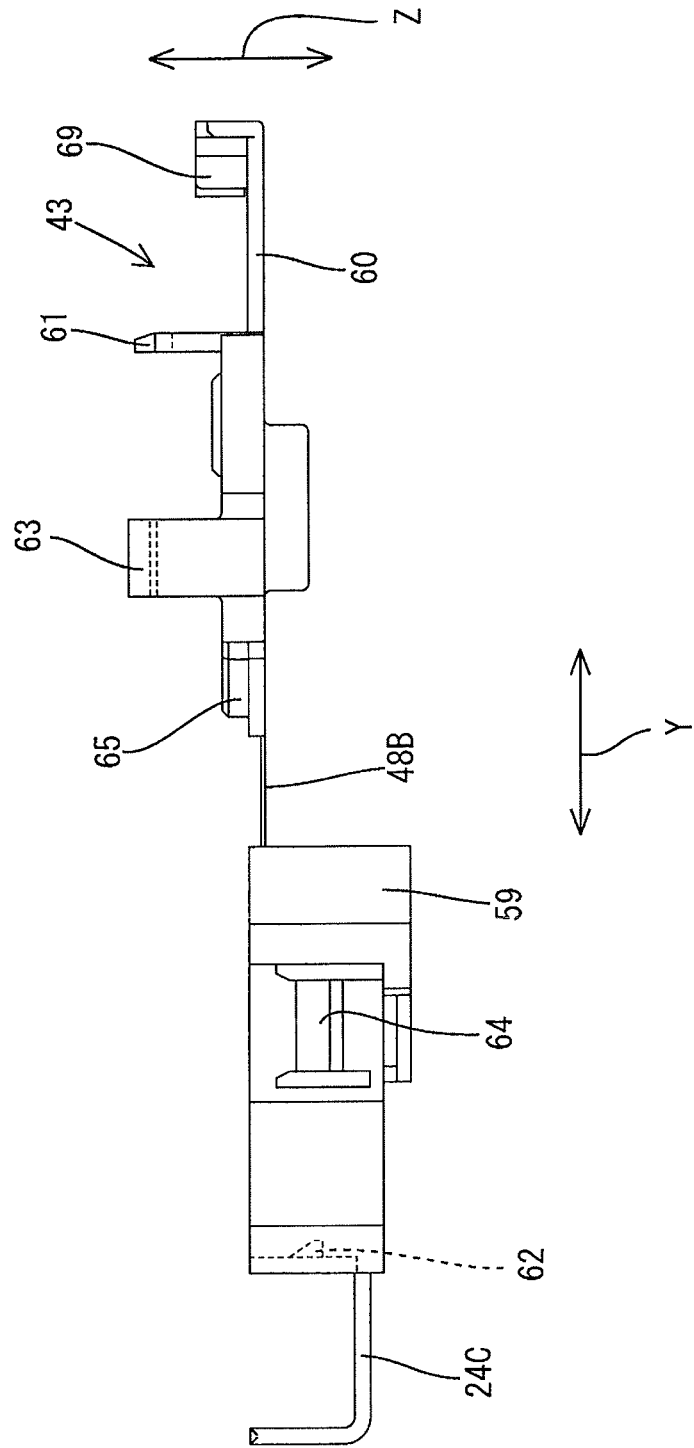
FIG. 14 is a side view illustrating the second end side connection unit.

As illustrated in FIG. 14, a second end side cover lock 61 formed on the second end side cover 60 is elastically fitted to a second end side cover lock receiver 62 formed on the second end side connecting member accommodation portion 59. Thereby, the second end side cover 60 covers apart of the second end side connecting member accommodation portion 59, the joint 25C and the wire arrangement portion 24C and maintains its state.

The second end side cover 60 further includes an auxiliary hinge 49C. The second end side cover 60 is movable around the auxiliary hinge 49C. A portion of the second end side cover 60 that corresponds to a connecting portion in which the second end side connecting member 58 is connected to the power conductor 15 is opened and closed.

Figure 13:
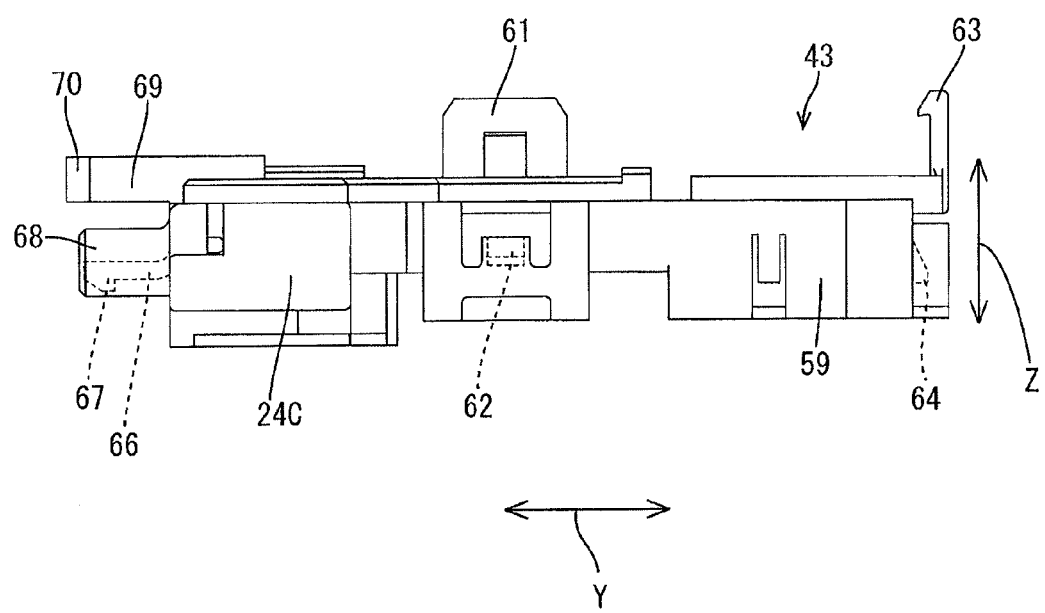
FIG. 13 is a front view illustrating the second end side connection unit.

As illustrated in FIG. 13, a second end side cover auxiliary lock 63 formed on the second end side cover 60 is elastically fitted to a second end side cover auxiliary lock receiver 64 formed on the second end side connecting member accommodation portion 59. Thereby, the second end side cover 60 covers a portion of the second end side connecting member accommodation portion 59 corresponding to a connecting portion in which the second end side connecting member 58 is connected to the power conductor 15 and maintains its state.

A second end side rib 65 is formed on a surface of the second end side cover 60 that faces the second end side connecting member accommodation portion 59 in its closed state. The second end side rib 65 is formed to project toward the second end side connecting member accommodation portion 59 in the closed state of the second end side cover 60. The second end side rib 65 is formed to be fitted in a space of the second end side connecting member accommodation portion 59 in the closed state of the second end side cover 60.

(Fitting Configuration of Second End Side Connection Unit 43)

Figure 12:
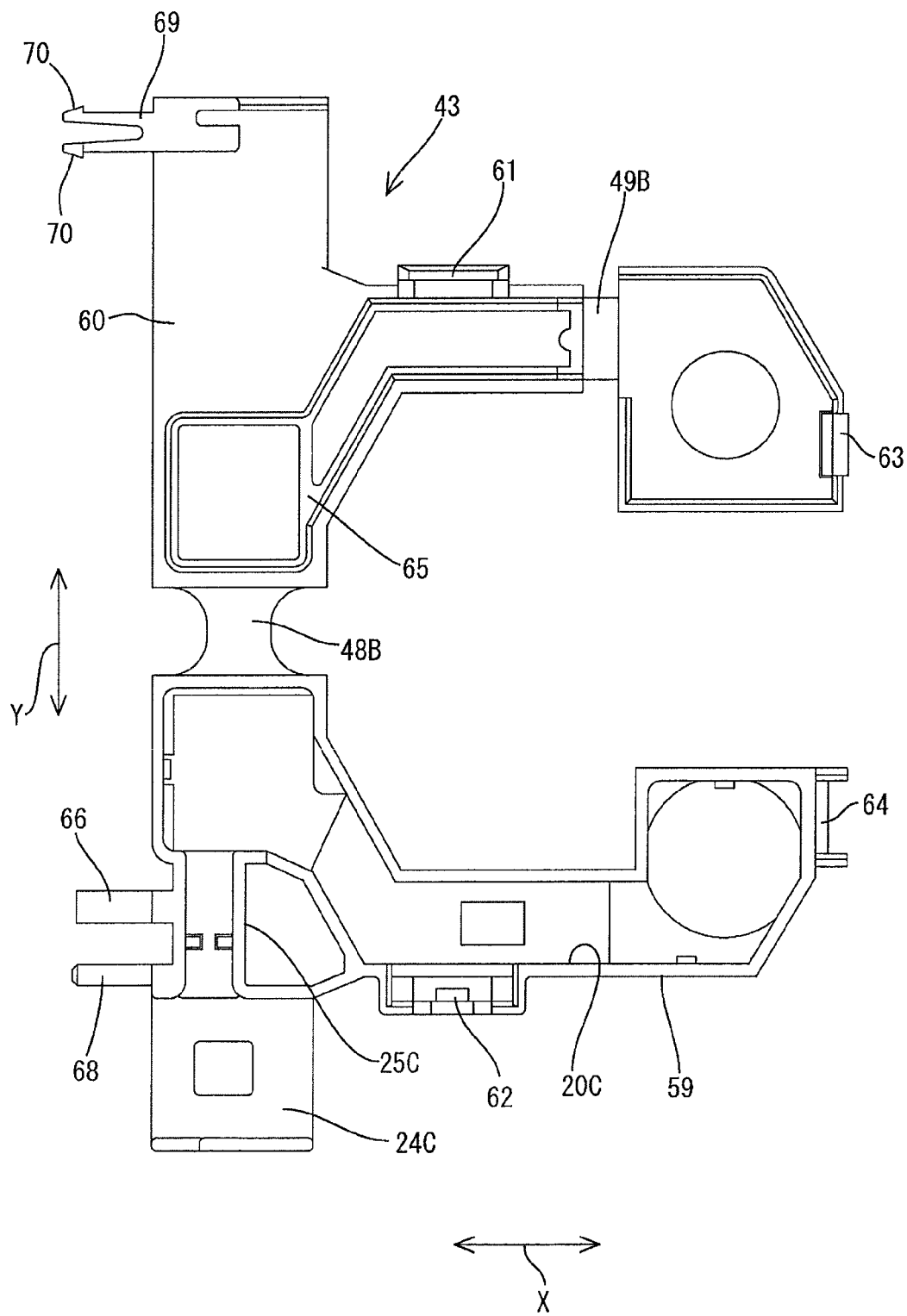
FIG. 12 is a plan view illustrating a second end side connection unit.
Figure 15:
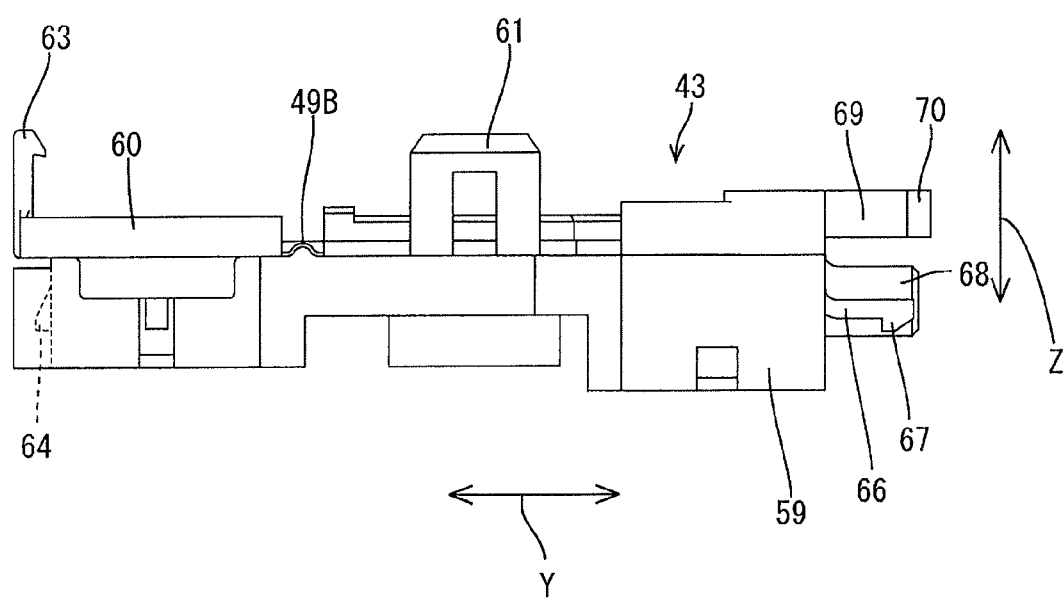
FIG. 15 is a rear view illustrating the second end side connection unit.

As illustrated in FIG. 12, a second end side unit stopper 66 is formed on a left side end of the second end side connection unit 43. The second end side unit stopper 66 is fitted to the unit stopper receiver 33 of the connection unit 16 that is arranged on the left side of the second end side connection unit 43. As illustrated in FIG. 12, the second end side unit stopper 66 projects leftwardly. As illustrated in FIG. 15, a second end side unit stopper projection 67 is formed at a distal end of the second end side unit stopper 66. The second end side unit stopper projection 67 projects downwardly.

The fitting configuration of the second end side unit stopper 66 and the unit stopper receiver 33 is substantially same as the fitting configuration of the unit stopper 31 and the unit stopper receiver 33 illustrated in FIG. 7, and explanation thereof will be omitted.

As illustrated in FIG. 12, a second end side guide 68 is formed on a left end of the second end side connection unit 43. The second end side guide 68 is provided adjacent to the unit stopper 31 in the front-rear direction (the direction Y in FIG. 12) and projects leftwardly. As illustrated in FIGS. 12 and 13, the second end guide 68 is formed in a flat plate in the front-rear direction (the direction Y in FIG. 12). The second end side guide 68 is fitted through the guide receiver 37 formed on the connection unit 16 that is arranged on the left side of the second end side connection unit 43.

(Fitting Configuration of Second End Side Cover 60)

As illustrated in FIG. 12, a second end side cover stopper 69 is formed on a left end of the second end side cover 60. The second end side cover stopper 69 projects leftwardly. The second end side cover stopper 69 is formed to be branched into two and a second end side cover stopper projection 70 is formed at each of the two branched distal ends. The second end side cover stopper projection 70 projects outwardly in the front-rear direction (in the direction Y in FIG. 12). The second end side cover stopper 69 is fitted to a cover stopper receiver 40 formed on the cover 27 of the connection unit 16 that is arranged on a left side of the second end side connection unit 43.

The fitting configuration of the second end side cover stopper 69 and the cover stopper receiver 40 is substantially same as the fitting configuration of the cover stopper 38 and the cover stopper receiver 40 illustrated in FIG. 8, and explanation thereof will be omitted.

As illustrated in FIG. 2, the second end side connection unit 43 is connected to the right end portion of the connection units 16 that are connected to each other. Specifically, with the configuration in which the second end side unit stopper 66 is fitted to the unit stopper receiver 33 and the configuration in which the second end side cover stopper 69 is fitted to the cover stopper receiver 40, the second end side connection unit 43 is connected to the connection unit 16.

In the present embodiment, the second end side unit stopper 66 and the unit stopper receiver 33 are fitted to each other in the right-left direction. The second end side cover stopper 66 and the cover stopper receiver 40 are fitted to each other in the right-left direction. Namely, the direction in which the second end side unit stopper 66 and the unit stopper receiver 33 are fitted to each other matches the direction in which the second end side cover stopper 69 and the cover stopper receiver 40 are fitted to each other.

(Assembling Method and Attaching Method)

Next, a method of assembling the battery connecting assembly 14 and a method of attaching the battery connecting assembly 14 will be explained. First, six connection units 16 are prepared. The unit stopper 31 of one connection unit 16 is fitted to the unit stopper receiver 33 of another connection unit 16 in the right-left direction, and the cover stopper 38 of the one connection unit 16 is fitted to the cover stopper receiver 40 of the other connection unit 16 in the right-left direction. Accordingly, the six connection units 16 are connected to each other in the right-left direction. Then, the connecting member 17 is arranged in the accommodation portion of each of the connection units 16.

Figure 16:
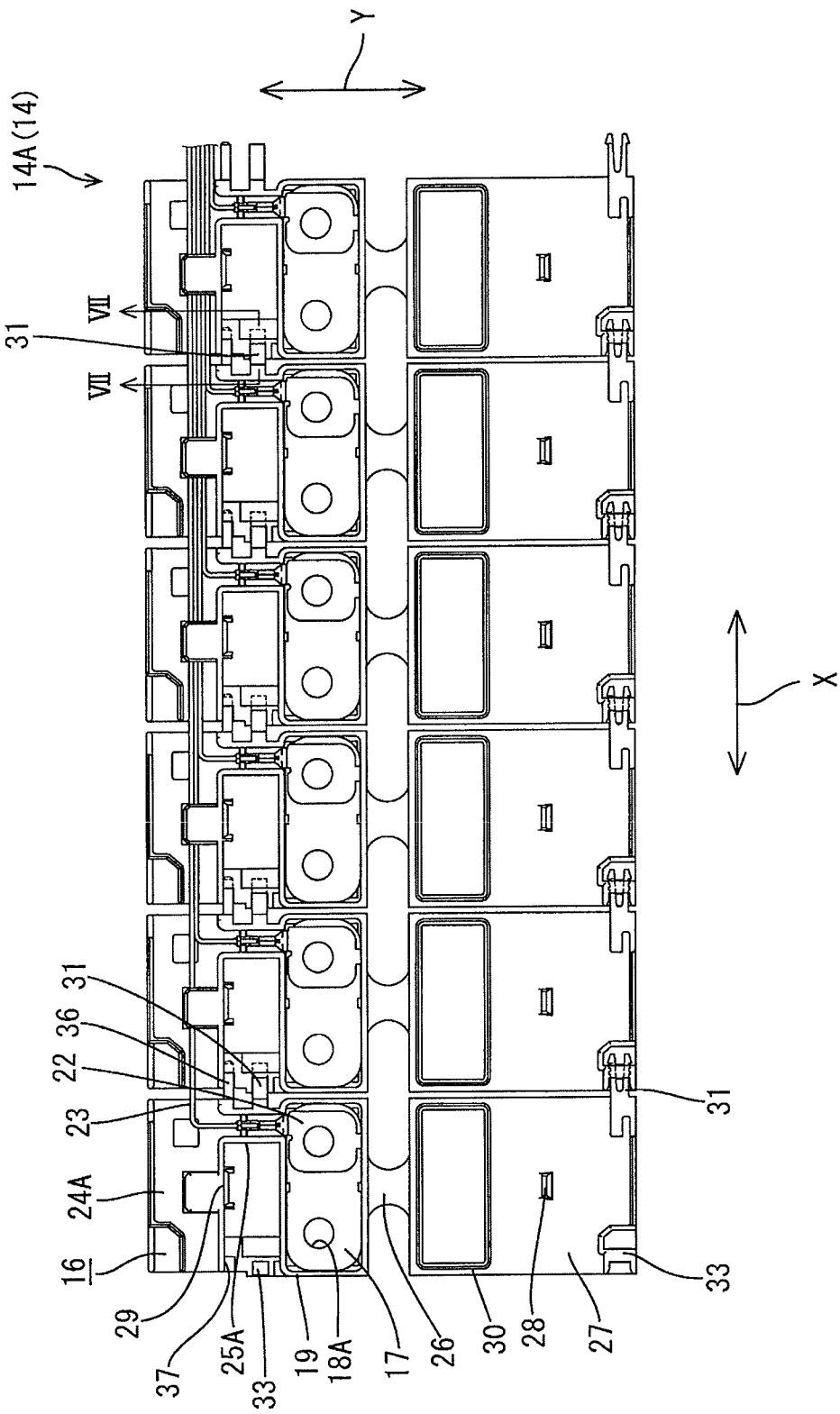
FIG. 16 is a plan view illustrating a joint battery connecting assembly.

Next, the voltage detection terminal 22 is crimped to one end of the voltage detection line 23 to connect the voltage detection line 23 and the voltage detection terminal 22. The voltage detection lines 23 are arranged in the wire arrangement portions 24A of the connected connection units 16. Each of the voltage detection terminals 22 is held by the corresponding joint 25A and each voltage detection terminal 22 is arranged in each accommodation portion 19. Accordingly, the joint battery connecting assembly 14A is assembled as illustrated in FIG. 16.

Next, one first end side connection unit 42, five connection units 16 and one second end side connection unit 43 are prepared. The first end side unit stopper receiver 43 of the first end side connection unit 32 and the stopper of the connection unit 16 are fitted to each other in the right-left direction, and the first end side cover stopper receiver 56 of the first end side connection unit 42 and the cover stopper 38 of the connection unit 16 are fitted to each other in the right-left direction. The unit stopper 31 of one connection unit 16 is fitted to the unit stopper receiver 33 of another connection unit 16 in the right-left direction, and the cover stopper 38 of the one connection unit 16 is fitted to the cover stopper receiver 40 of the other connection unit 16 in the right-left direction. The unit stopper receiver 33 of the connection unit 16 and the second unit stopper 66 of the second end side connection unit 43 are fitted to each other in the right-left direction, and the cover stopper receiver 40 of the connection unit 16 and the second cover stopper 38 of the second end side connection unit 43 are fitted to each other in the right-left direction.

Next, the first end side connecting member 44 is arranged in the first end side connecting member accommodation portion 46 of the first end side connection unit 42. The connecting member 17 is arranged in the accommodation portion 19 of each connection unit 16. The second end side connecting member is arranged in the second side end connecting member accommodation portion 59 of the second end side connection unit 43.

Figure 17:
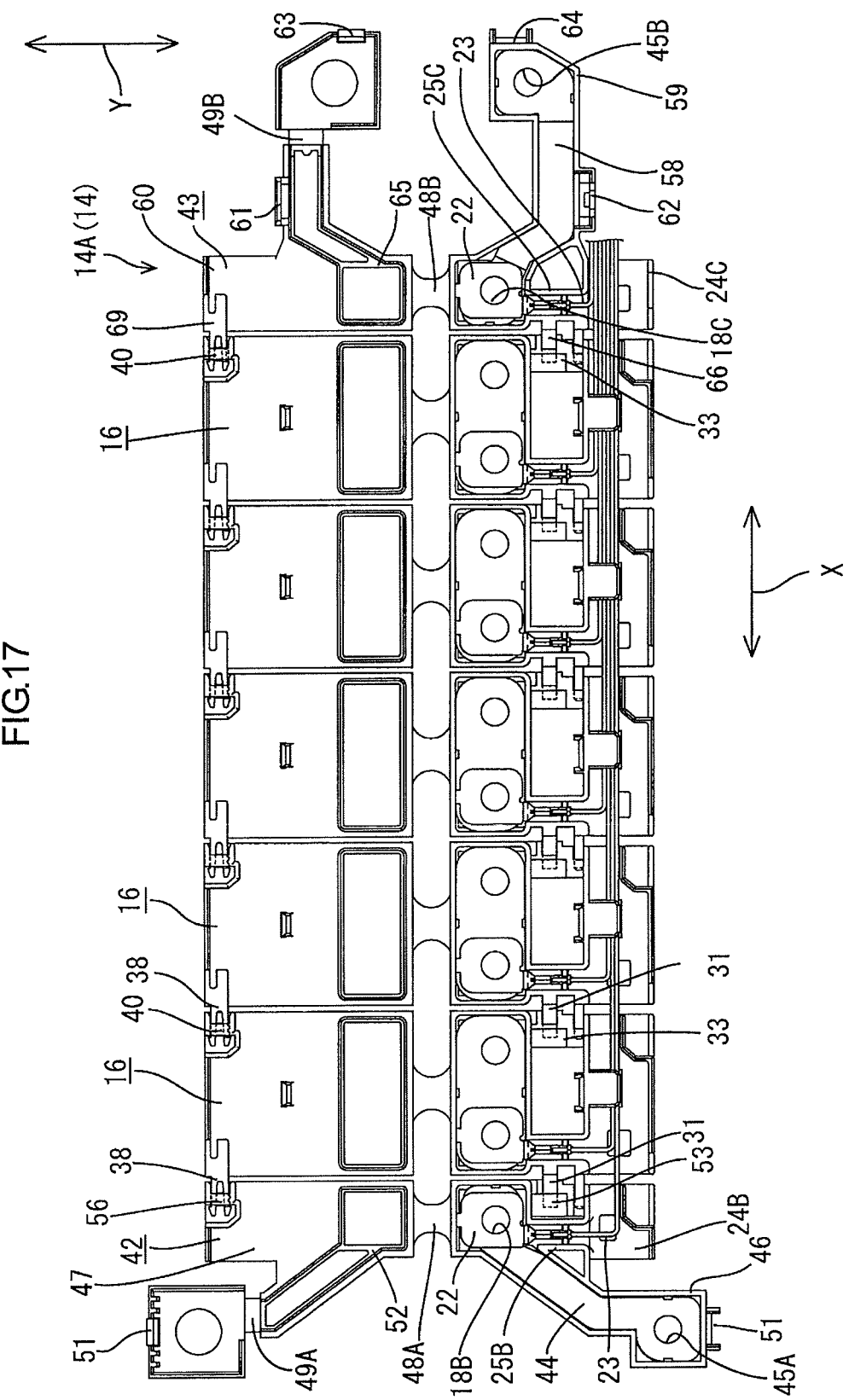
FIG. 17 is a plan view illustrating an external connection battery connecting assembly.
Figure 18:
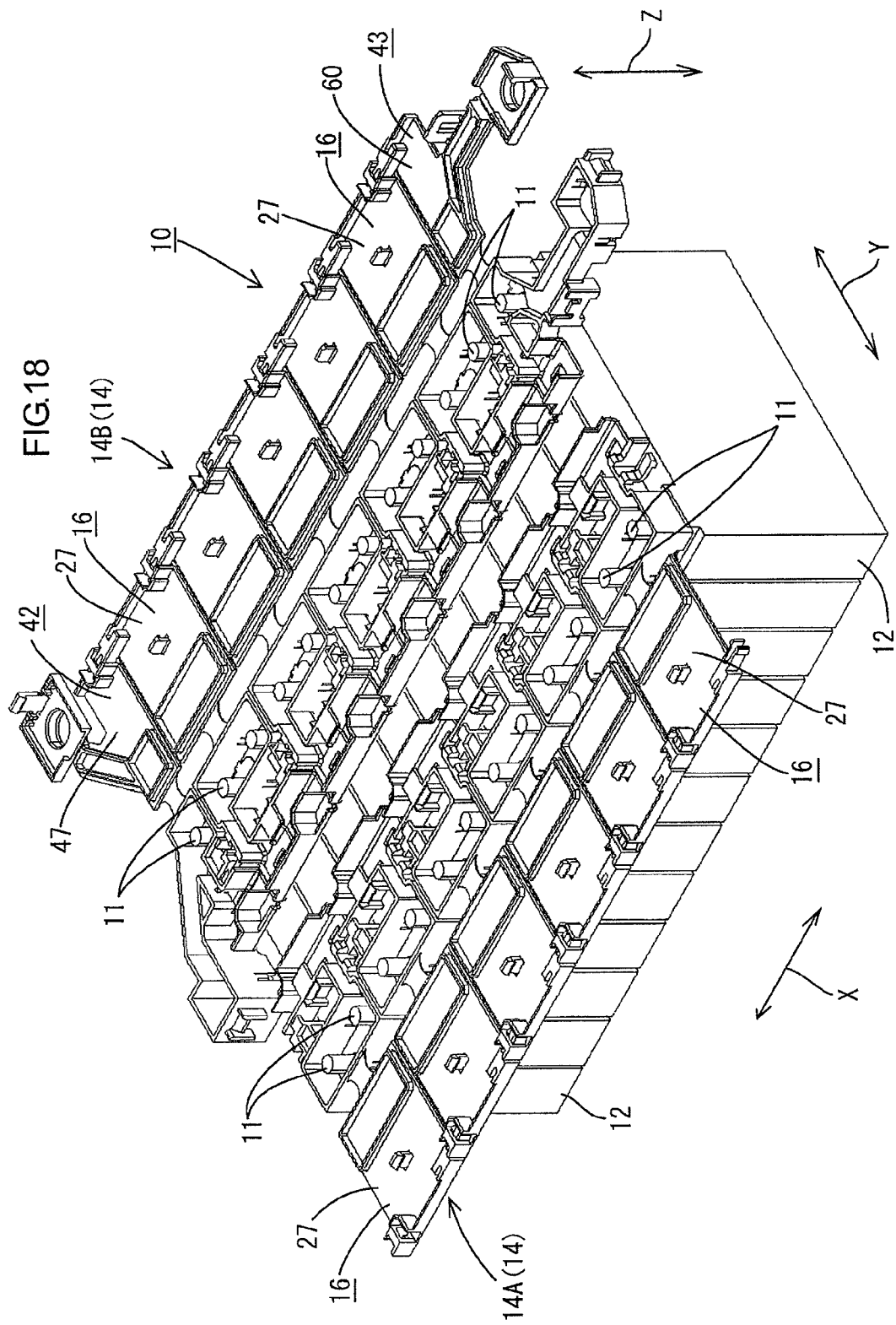
FIG. 18 is a perspective view illustrating the battery connecting assembly that is mounted to a battery group.

Next, the voltage detection terminal 22 is crimped to one end of each voltage detection line 23 to connect the voltage detection line 23 and the voltage detection terminal 22. The voltage detection lines 23 are arranged in the wire arrangement portions 24A, 24B, 24C of the connection units 16, the first end side connection unit 42, and the second end side connection unit 43 that are connected to each other. Each voltage detection terminal 22 is held by each of the joints 25A, 25B, 25C, and each voltage detection terminal 22 is arranged in the first end side connecting member accommodation portion 46, the accommodation portion 19, and the second end side connecting member accommodation portion 59. Accordingly, the external connection battery connecting assembly 14B is assembled as illustrated in FIG. 17.

Next, twelve batteries 12 are arranged such that the surfaces having the electrode terminals 11 face upwardly. Each of the batteries 12 is arranged such that the electrode terminals 11 of each battery 12 is arranged along the front-rear direction and the twelve batteries 12 are arranged in the right-left direction. The joint battery connecting assembly 14A is attached from the above to the electrode terminals 11 located on the front side of the battery group 13. The electrode terminals 11 are fitted through the electrode terminal through holes 18A, 18B, 18C of the connecting member 17.

Next, the external connection battery connecting assembly 14B is attached from the above to the electrode terminals 11 located on the rear side of the battery group 13. Each of the electrode terminals 11 is fitted through the electrode terminal through hole 18B of the first end side connecting member 44, the electrode terminal through holes 18A of the connecting members 17, and the electrode terminal through hole 18C of the second end side connecting member 58 (see FIG. 18).

Then, the nut 21 is screwed to each of the electrode terminals 11. Accordingly, the twelve batteries 12 are connected in series, as illustrated in FIG. 2.

Next, the connected covers 27 of the joint battery connecting assembly 14A are moved around the hinges 26 and the connected covers 27 are closed to cover the accommodation portions 19, the joints 25A, and the wire arrangement portions 24A. The cover locks 28 and the cover lock receivers 29 are elastically fitted to each other, and this keeps the covers 27 in the closed state.

In the external connection battery connecting assembly 14B, the first end side cover 47, the covers 27, and the second end side cover 60 that are connected to each other are moved around the main hinges 48A, 48B and the hinges 26 and the connected covers 47, 27, 60 are closed to cover the accommodation portions 19, the joints 25A, 25B, 25C, and the wire arrangement portions 24A, 24B, 24C. The cover locks 28 and the cover lock receivers 29 are elastically fitted to each other, and the second end side cover lock 61 is elastically fitted to the second end side cover lock receiver 62 of the second end side connecting member accommodation portion 59, and this keeps the first end side cover 47, the covers 27, and the second end side cover 60 that are connected to each other in the closed state.

Figure 19:
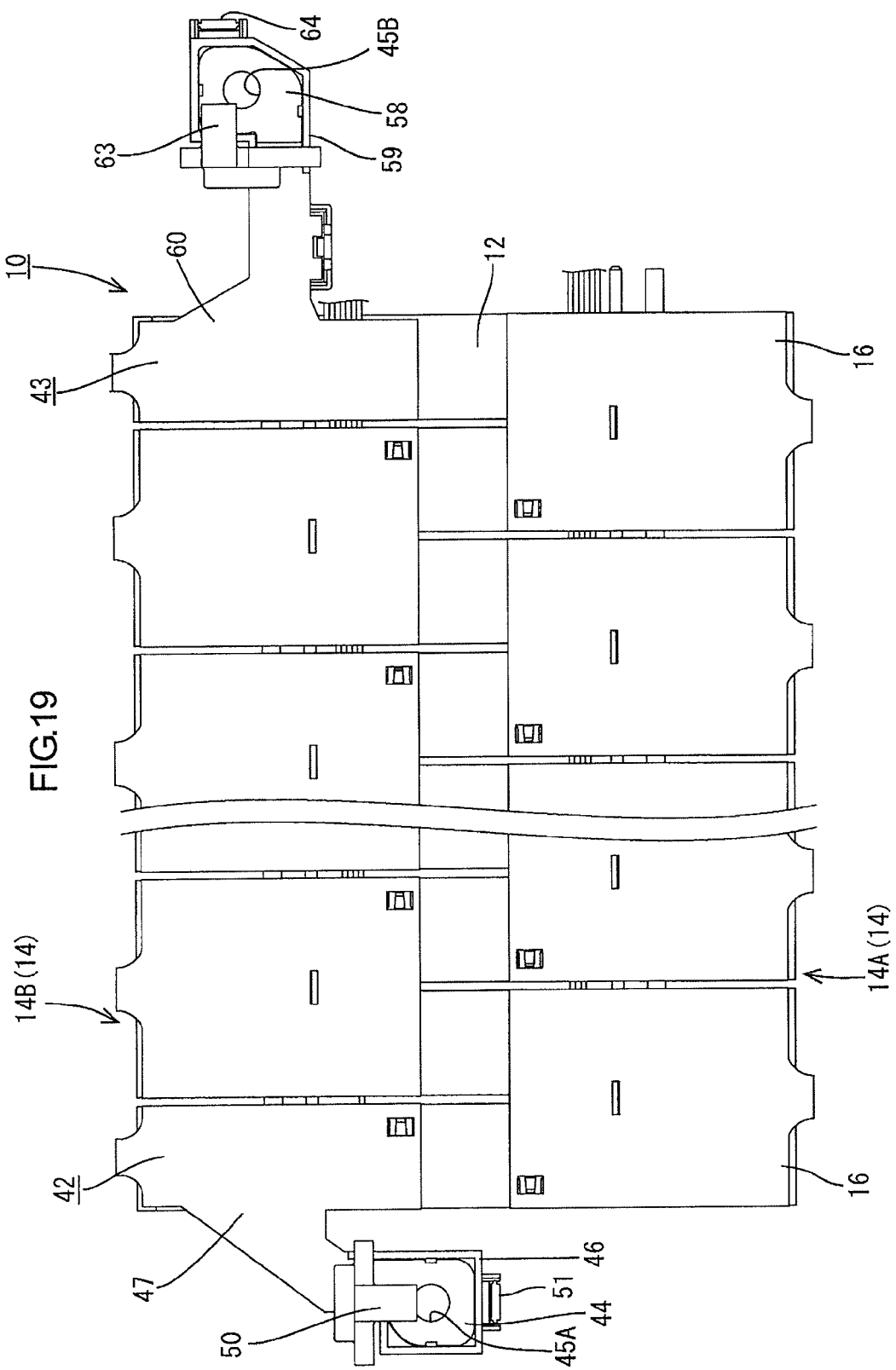
FIG. 19 is a plan view illustrating the first end side cover and the second end side cover that are open by an auxiliary hinge.
Figure 20:
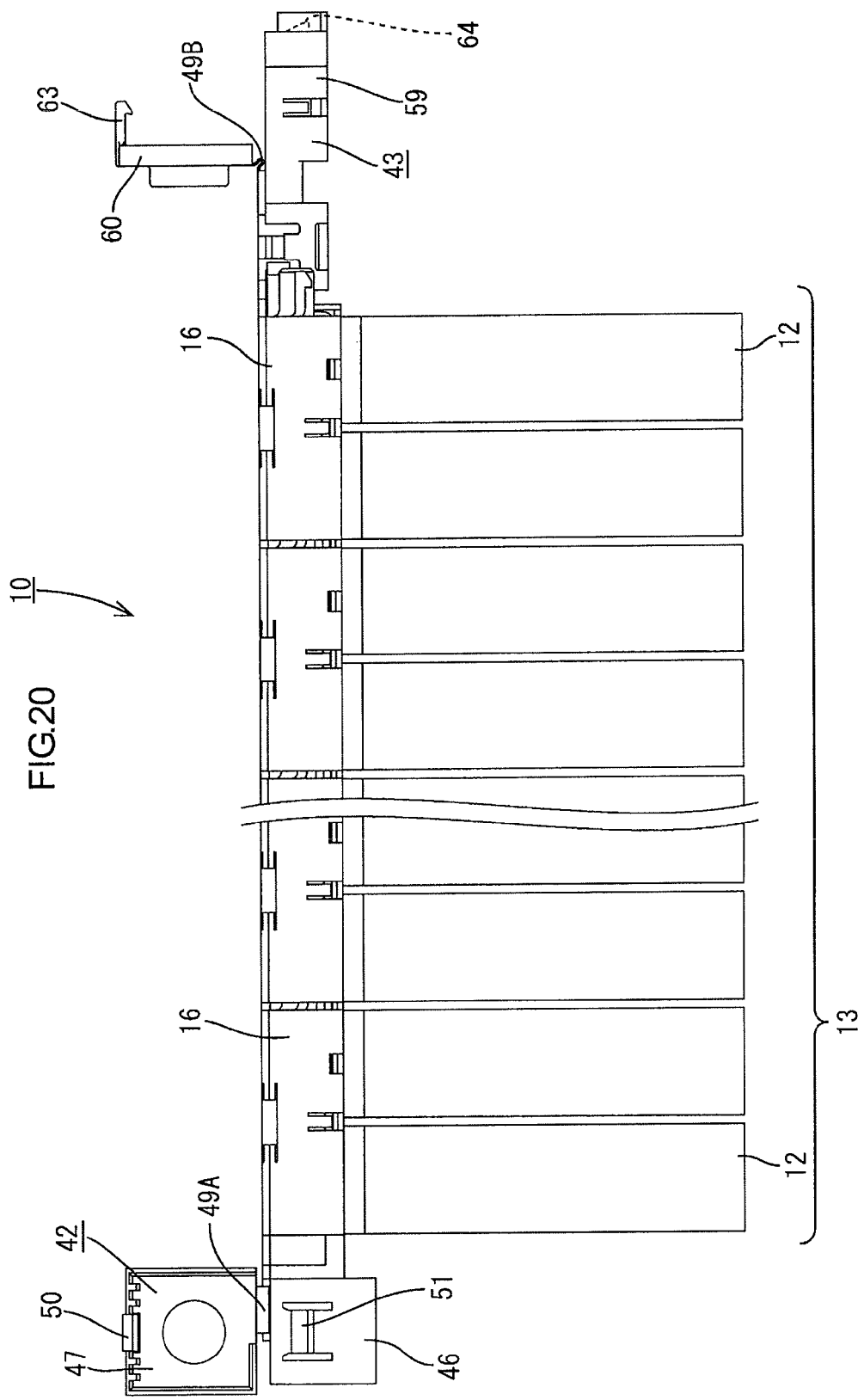
FIG. 20 is a side view illustrating the first end side cover and the second end side cover that are open by the auxiliary hinge.
Figure 21:
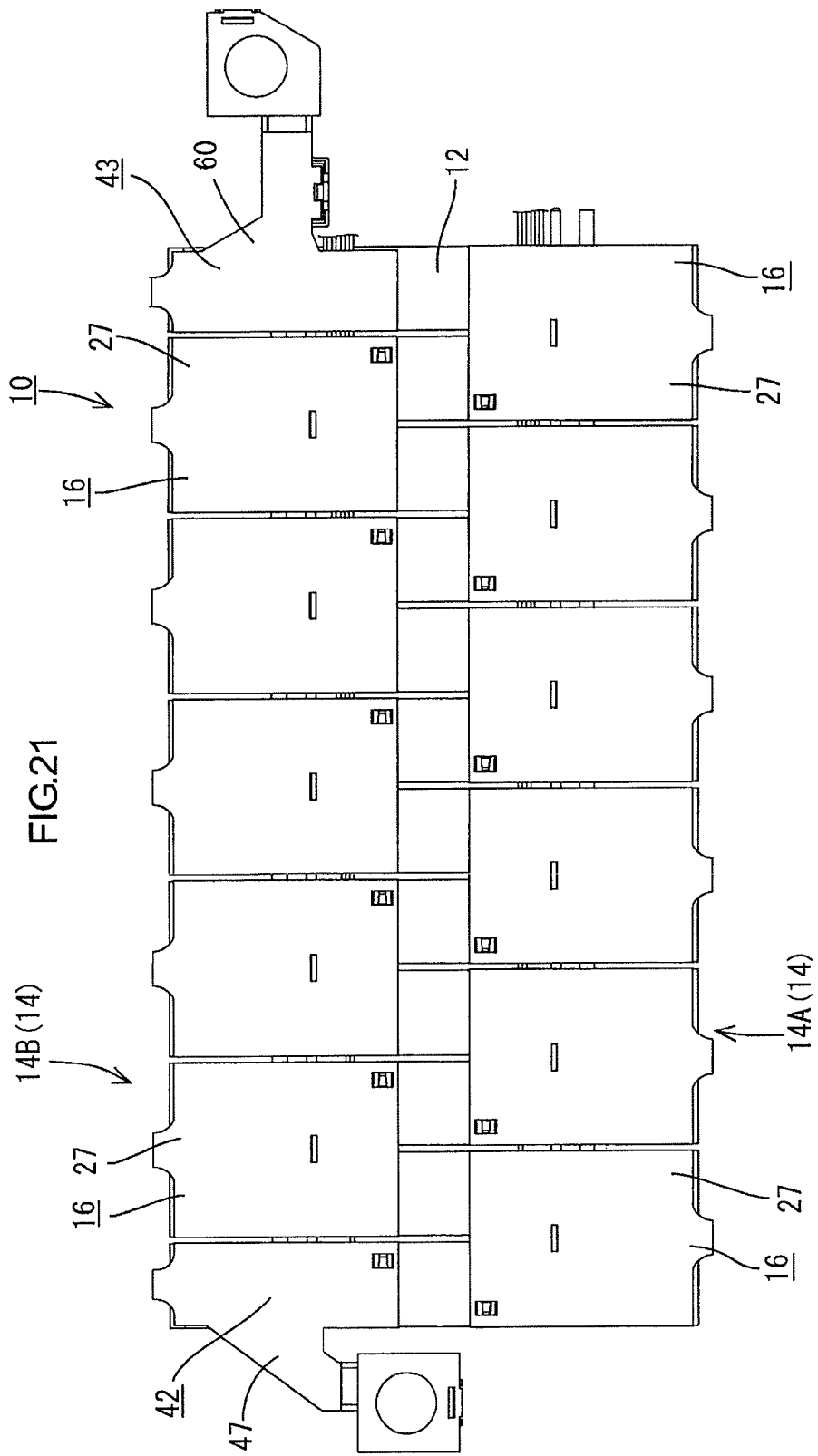
FIG. 21 is a plan view illustrating the first end side cover and the second end side cover that are closed by the auxiliary hinge.
Figure 22:
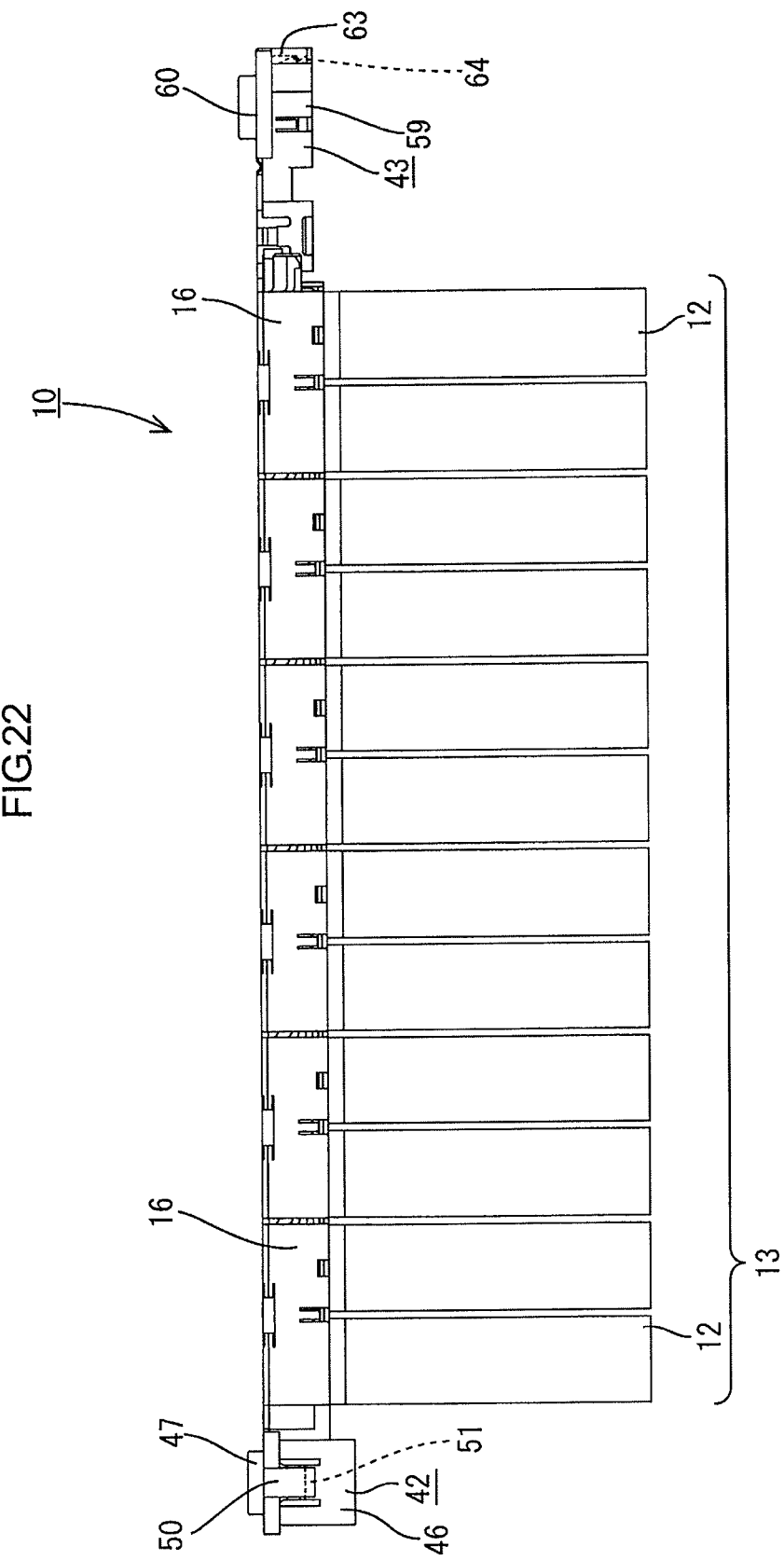
FIG. 22 is a side view illustrating the first end side cover and the second end side cover that are closed by the auxiliary hinge.
Figure 23:
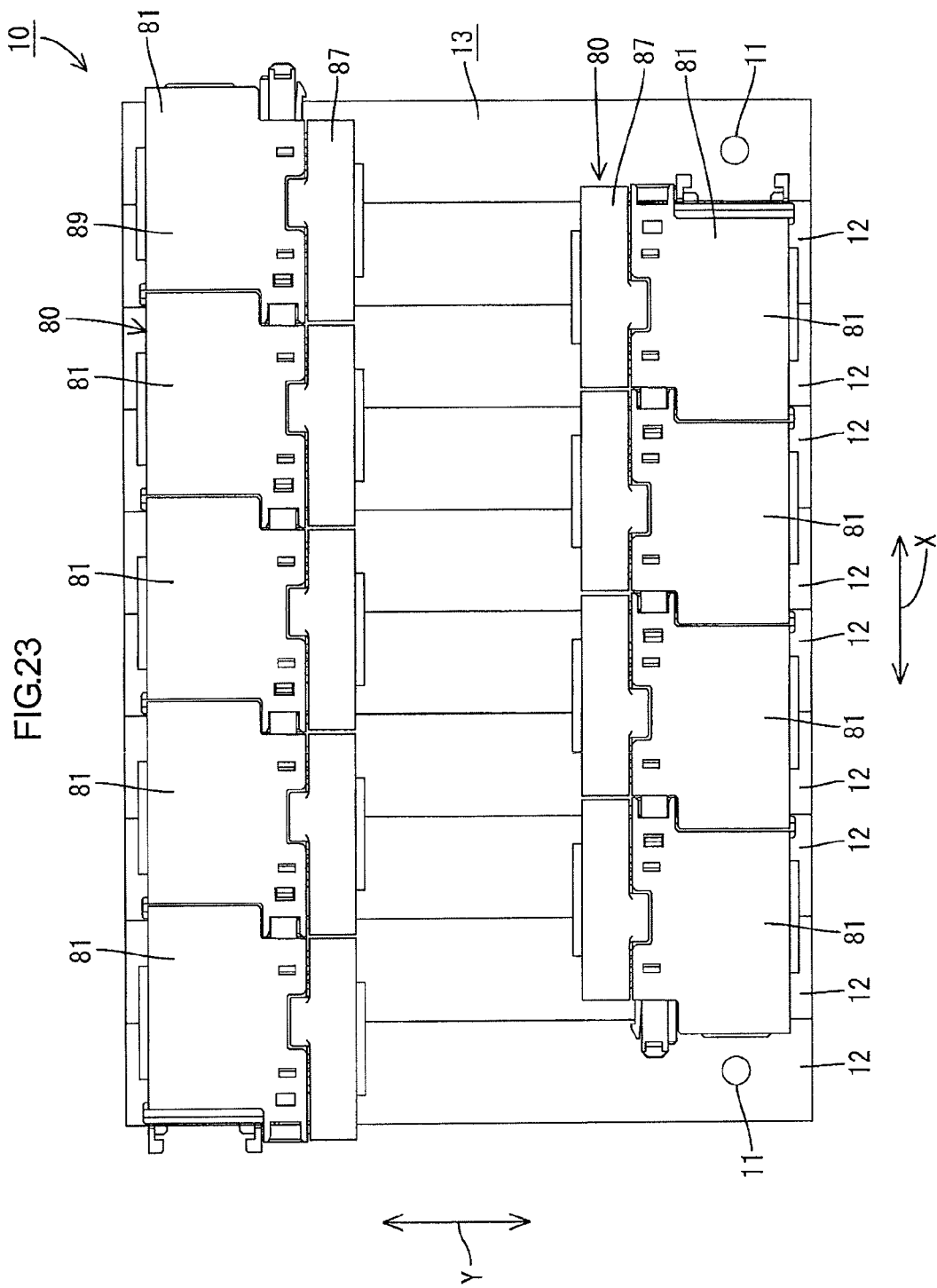
FIG. 23 is a plan view illustrating a battery module according to a second embodiment.

In such a closed state, the portion of the first end side connection unit 42 corresponding to a portion in which the first end side connecting member 44 is connected to an external conductor and the portion of the second end side connection unit 43 corresponding to a portion in which the second end side connecting member 58 is connected to the external conductor are movable around the auxiliary hinge 49 to be closed and open (see FIGS. 19 and 20).

Next, the first end side connecting member 44 is connected to the power conductor 15 mounted in a vehicle by screwing a bolt, and the second end side connecting member 58 is connected to the power conductor 15 by screwing a bolt. Then, the first end side cover 47 is moved around the auxiliary hinge 49A to elastically fit the first end side cover lock 50 and the first end cover lock receiver 51. This keeps the first end side cover 47 to cover the first end side connecting member accommodation portion 46. The second end side cover 60 is moved around the auxiliary hinge 49B to elastically fit the second end side cover auxiliary lock 63 and the second end side cover auxiliary lock receiver 64. This keeps the second end side cover 60 to cover the second end side connecting member accommodation portion 59 (see FIGS. 1, 21, and 22). Accordingly, the battery module 10 is assembled.

(Operations and Advantageous Effects of the Present Embodiment)

Operations and advantageous effects of the present embodiment will be explained. According to the present embodiment, the connection unit 16 includes the cover 27 covering the accommodation portion 19 in which the connecting member 17 is arranged. The cover 27 is closed to cover the accommodation portion 19. Therefore, the connecting member 17 arranged in the accommodation portion 19 and the electrode terminals 11 connected to the connecting members 17 are less likely to be in contact with any foreign obstacles.

According to the present embodiment, the cover 27 is integrally formed with each connection unit 16. Therefore, even if the number of batteries 12 included in the battery module 10 increases, the number of connection units 16 that are connected increases to deal with the increase in number of batteries 12. Namely, only one mold for molding one connection unit 16 is necessary to be manufactured to mold a predetermined number of connection units 16. Therefore, a mold for molding a separate cover is not required and not necessary to be increased in size. This reduces a cost for manufacturing the mold compared to a configuration including a cover separately provided from the connection unit 16 to cover the accommodation portion 19. Further, even if the number of batteries 12 included in the battery module 10 decreases, the number of connection units 16 can be reduced. Only one mold for molding the connection unit 16 can deal with the reduction in number of connection units 16. According to the present embodiment, even if the number of batteries 12 included in the battery module 10 increases or decreases, the cost for manufacturing the mold is less likely to increase.

According to the present embodiment, the covers 27 are connected to each other by fitting the cover stoppers 38 and the cover stopper receivers 40. With such a configuration, after the joint battery connecting assembly 14A is attached to the aligned batteries 12, the operation of closing the connected covers 27 is carried out only once to close the covers 27 of the connection units 16 and cover all of the accommodation portions 19 of the connection units 16. This improves efficiency of assembling the joint battery connecting assembly 14A to the batteries 12.

According to the present embodiment, the unit stopper 31 has the unit stopper projection 32, and the unit stopper receiver 33 has the unit stopper hole 34 through which the unit stopper projection 32 is fitted through, and the unit stopper projection 32 is stopped by the opening edge of the unit stopper hole 34. With such a simple configuration in which the unit stopper projection 32 is stopped by the opening edge of the unit stopper hole 34, the connection units 16 are connected to each other.

According to the present embodiment, the cover stopper 38 has the cover stopper projection 39, and the cover stopper receiver 40 has the cover stopper hole 41 through which the cover stopper projection 39 is fitted, and the cover stopper projection 39 is stopped by the opening edge of the cover stopper hole 41. With such a simple configuration in which the cover stopper projection is stopped by the opening edge of the cover stopper hole 41, the covers 27 are connected to each other.

In the fitting configuration in which the stopper projection is stopped by the opening edge of the stopper hole, the predetermined clearance 35A, 35B is provided between the opening edge of the stopper hole and the stopper projection. Without the clearance 35A, 35B, the stopper projection may not be stopped by the opening edge of the stopper hole due to a small dimension error. The predetermined clearance corresponds to a general dimension range of a clearance that is required to use the stopper mechanism in which the stopper projection is stopped by an opening edge of the stopper hole.

In the configuration of the battery group 13 including batteries 12 that are aligned, a tolerance caused in assembling the batteries 12 in its alignment direction and a tolerance in size of the electrode terminals 11 provided on each battery 12 are accumulated in the alignment direction in which the batteries 12 are aligned. Therefore, as is closer to ends of the battery group 13 in the alignment direction of the batteries 12, a position gap is likely to be generated between the electrode terminals 11 of the battery 12 and the connecting member 17 of the battery connecting assembly 14. With the above configuration, the predetermined clearance 35A is provided between an opening edge of the unit stopper hole 34 and the unit stopper projection 32, and the predetermined clearance 35B is provided between an opening edge of the cover stopper hole 41 and the cover stopper projection 39. The clearance 35A, 35B absorbs a tolerance caused in assembling the batteries 12 in its alignment direction and a tolerance in size of the electrode terminals 11 provided on each battery 12. With the above configuration, any special configuration is not required to absorb a tolerance caused in assembling the batteries 12 in its alignment direction and a tolerance in size of the electrode terminals 11 provided on each battery 12.

According to the present embodiment, the accommodation portion 19 has the opening 20A and the cover 27 has the rib 30 on its surface facing the accommodation portion 19 in its closed state covering the accommodation portion 19. The rib 30 projects toward the accommodation portion 19 and fits into the opening 20A in the closed state. According to the present embodiment, if the cover 27 is closed to cover the accommodation portion 19, the rib 30 formed on the cover 27 fits into the opening 20A of the accommodation portion 19. With this configuration, if the cover 27 is slightly open, any foreign obstacle is less likely to enter the accommodation portion 19 due to the rib 30 fitting into the accommodation portion 19.

Further, according to the present embodiment, the rib 30 is formed in a closed loop, and therefore, any foreign obstacle is less likely to enter the accommodation portion 19.

According to the present embodiment, the direction in which the unit stopper 31 and the unit stopper receiver 33 are fitted to each other in connecting the adjacent connection units 16 matches the direction in which the cover stopper 38 and the cover stopper receiver 40 are fitted to each other in connecting the covers 27 formed on the adjacent connection units 16. Therefore, a process of connecting the adjacent connection units 16 and a process of connecting the covers 27 formed on the adjacent connection units 16 are carried out with one operation. This improves efficiency of an assembling process of the battery connecting assembly 14.

According to the present embodiment, each of the two ends of the connected connection units 16 are connected to the first end side connection unit 42 and the second end side connection unit 43, respectively. The first end side connection unit 42 and the second end side connection unit 43 include the first end side connecting member 44 and the second end side connecting member 58, respectively. The first end side connecting member 44 and the second end side connecting member 58 connect the electrode terminals 11 and the power conductor 15. With such a configuration, the electrode terminals 11 of the battery 12 are connected to the power conductor 15 at the ends of the battery group 13. Any conductor such as an electric wire or bus bar can be used as the power conductor.

In the present embodiment, the covers 27 are connected to each other and the first end side cover 47 and the second end side cover 60 are connected to the covers 27 located at the ends. With this configuration, the operation of closing the covers 27, the first end side cover 47 and the second end side cover 60 that are connected to be one component is carried out only once to cover all of the accommodation portions 19, the first end side connecting member accommodation portion 46, and the second end side connecting member accommodation portion 59 with the covers 27, the first end side cover 47 and the second end side cover 60. The accommodation portions 19, the first end side connecting member accommodation portion 46, and the second end side connecting member accommodation portion 59 are formed in the connection units, the first end side connection unit 42, and the second end connection unit 43, respectively. This improves operation efficiency of assembling the battery connecting assembly 14 to the batteries 12.

However, with the above configuration, the process of connecting the power conductor 15 to the first end side connecting member 44 and the second end side connecting member 58 may be carried out before the process of covering the accommodation portions 19, the first end side connecting member accommodation portion 46 and the second end side connecting member accommodation portion 59 with the covers 27, the first end side cover 47 and the second end side cover 60. This may cause some restriction in the operation process.

According to the present embodiment, the first end side cover 47 includes the auxiliary hinge 49A and the portion of the first end side cover 47 corresponding to a portion in which the first end side connecting member 44 and the power conductor 15 are connected to each other is opened and closed by the auxiliary hinge 49A. As a result, after executing the process of covering the accommodation portions 19, the first end side connecting member accommodation portion 46 with the covers 27 and the first end side cover 47, the portion of the first end side cover 47 corresponding to the portion in which the first end side connecting member 44 and the power conductor 15 are connected to each other can be opened via the auxiliary hinge 49A. Therefore, even after the process of covering the accommodation portions 19 and the first end side connecting member accommodation portion 46 with the covers 27 and the first end side cover 47, the first end side connecting member 44 and the power conductor 15 are connected to each other. After connecting the first end side connecting member 44 and the power conductor 15, the portion of the first end side cover 47 in which the first end side connecting member 44 and the power conductor 15 are connected is closed via the auxiliary hinge 49A. Therefore, any foreign obstacles are less likely to be in contact with the connecting member 17 and the first end side connecting member 44. According to the present embodiment, the process of connecting the first end side connecting member 44 and the power conductor 15 is carried out before or after the process of covering the accommodation portion 19 and the first end side connecting member accommodation portion 46 with the covers 27 and the first end side cover 47. With this configuration, the process of assembling the battery connecting assembly 14 is carried out in various ways.

According to the present embodiment, the second side cover 60 includes the auxiliary hinge 49B, and the portion of the second end side cover 60 corresponding to the portion in which the second end side connecting member 58 and the power conductor 15 are connected is opened and closed via the auxiliary hinge 49B. Therefore, according to the present embodiment, the second end side connecting member 58 and the power conductor 15 are connected to each other before or after the process of covering the accommodation portions 19 and the second end side connecting member accommodation portion 59 with the covers 27 and the second end side cover 60. With this configuration, the process of assembling the battery connecting assembly 14 is carried out in various ways.

According to the present embodiment, the second end side unit stopper 66 has the second end side unit stopper projection 67 and the second end side unit stopper projection 67 is stopped by the opening end of the unit stopper hole 34. The first end side unit stopper receiver 53 has the first end side unit stopper hole 54 through which the unit stopper projection 32 is fitted. The unit stopper projection 32 is stopped by the opening edge of the first end side unit stopper hole 54. The second end side cover stopper 69 has the second end side cover stopper projection 70 and the second end side cover stopper projection 70 is stopped by the opening edge of the cover stopper hole 41. The first end side cover stopper receiver 56 has the first end side cover stopper hole 57 through which the cover stopper projection 39 is fitted. The cover stopper projection 39 is stopped by the opening edge of the first end side cover stopper hole 57.

With the simple configuration in which the second end side unit stopper projection 67 is stopped by the opening edge of the unit stopper hole 34, the connection unit 16 and the second end side connection unit 43 are connected to each other. With the simple configuration in which the unit stopper projection 32 is stopped by the opening edge of the first end side unit stopper hole 54, the connection unit 16 and the first end side connection unit 42 are connected to each other.

With the simple configuration in which the cover stopper projection 39 is stopped by the opening edge of the first end side cover stopper hole 57, the cover 27 and the first end side cover 47 are connected to each other. With the simple configuration in which the second end side cover stopper projection 70 is stopped by the opening edge of the cover stopper hole 41, the cover 27 and the second end side cover 60 are connected.

As described before, in the configuration of the battery group 13 including batteries 12 that are aligned, a tolerance caused in assembling the batteries 12 and a tolerance in size of the electrode terminals 11 provided on each battery 12 are accumulated in the alignment direction in which the batteries 12 are aligned. Therefore, as is closer to ends of the battery group 13 in the alignment direction of the batteries 12, a position gap is likely to be generated between the electrode terminals 11 of the battery 12 and the connecting member 17 of the battery connecting assembly 14. Especially, the position gap may be greater in the first end side connection unit 42 and the second end side connection unit 43 that are connected to the ends of the connection units 16. With the above configuration, a predetermined clearance is provided between the second end side unit stopper projection 67 and the opening edge of the unit stopper hole 34, between the unit stopper projection 32 and the opening edge of the first end side unit stopper hole 54, between the cover stopper projection 39 and the opening edge of the first end side cover stopper hole 57, and between the second end side cover stopper projection 70 and the opening edge of the cover stopper hole 41. The clearance absorbs a tolerance caused in assembling the batteries 12 in its alignment direction and a tolerance in size of the electrode terminals 11 provided on each battery 12.

According to the present embodiment, the first end side connecting member accommodation portion 46 has an opening 20B. The first end side cover 47 has the first end side rib 52 on a surface that faces the first end side connecting member accommodation portion 46 in its closed state to cover the first end side connecting member accommodation portion 46. The first end side rib 52 projects toward the first end side connecting member accommodation portion 46 and fits into the opening 20B in the closed state of the cover 47.

With the above configuration, if the first end side cover 47 covers the first end side connecting member accommodation portion 46, the first end side rib 52 formed on the first end side cover 47 fits into the opening 20B of the first end side connecting member accommodation portion 46. Therefore, if the first end side cover 47 is slightly open, any foreign obstacle is less likely to enter the first end side connecting member accommodation portion 46 by the first end side rib 52 fitting into the first end side connecting member accommodation portion 46.

According to the present embodiment, the second end side connecting member accommodation portion 59 has an opening 20C. The second end side cover 60 has the second end side rib 65 on a surface that faces the second end side connecting member accommodation portion 59 in its closed state to cover the second end side connecting member accommodation portion 59. The second end side rib 65 projects toward the second end side connecting member accommodation portion 59 and fits into the opening 20C in the closed state of the cover 60.

With the above configuration, if the second end side cover 60 covers the second end side connecting member accommodation portion 59, the second end side rib 65 formed on the second end side cover 60 fits into the opening 20C of the second end side connecting member accommodation portion 59. Therefore, if the second end side cover 60 is slightly open, any foreign obstacle is less likely to enter the second end side connecting member accommodation portion 59 by the second end side rib 65 fitting into the second end side connecting member accommodation portion 59.

The direction in which the connection unit 16 and the first end side connection unit 42 are connected to each other matches the direction in which the cover 27 and the first end side cover 47 are connected to each other. Therefore, a process of connecting the connecting unit 16 and the first end side connection unit 42 and a process of connecting the cover 27 and the first end side cover 47 are carried out with one operation. This improves efficiency of an assembling process of the battery connecting assembly 14.

The direction in which the connection unit 16 and the second end side connection unit 43 are connected to each other matches the direction in which the cover 27 and the second end side cover 60 are connected to each other. Therefore, a process of connecting the connecting unit 16 and the second end side connection unit 43 and a process of connecting the cover 27 and the second end side cover 60 are carried out with one operation. This improves efficiency of an assembling process of the battery connecting assembly 14.

Second Embodiment

A second embodiment of the present invention will be explained with reference to FIGS. 23 to 27. A battery connecting assembly 80 of the present embodiment is provided to the battery group 13 including a plurality of (ten in this embodiment) batteries 12. The batteries 12 are electrically connected to each other by the battery connecting assembly 80.

In the present embodiment, connection units 81 are aligned along the right-left direction (the direction X in FIG. 23) to configure the battery connecting assembly 80. Two battery connecting assemblies 80 are arranged in the front-rear direction (the direction Y in FIG. 23) and mounted to the battery group 13.

Figure 24:
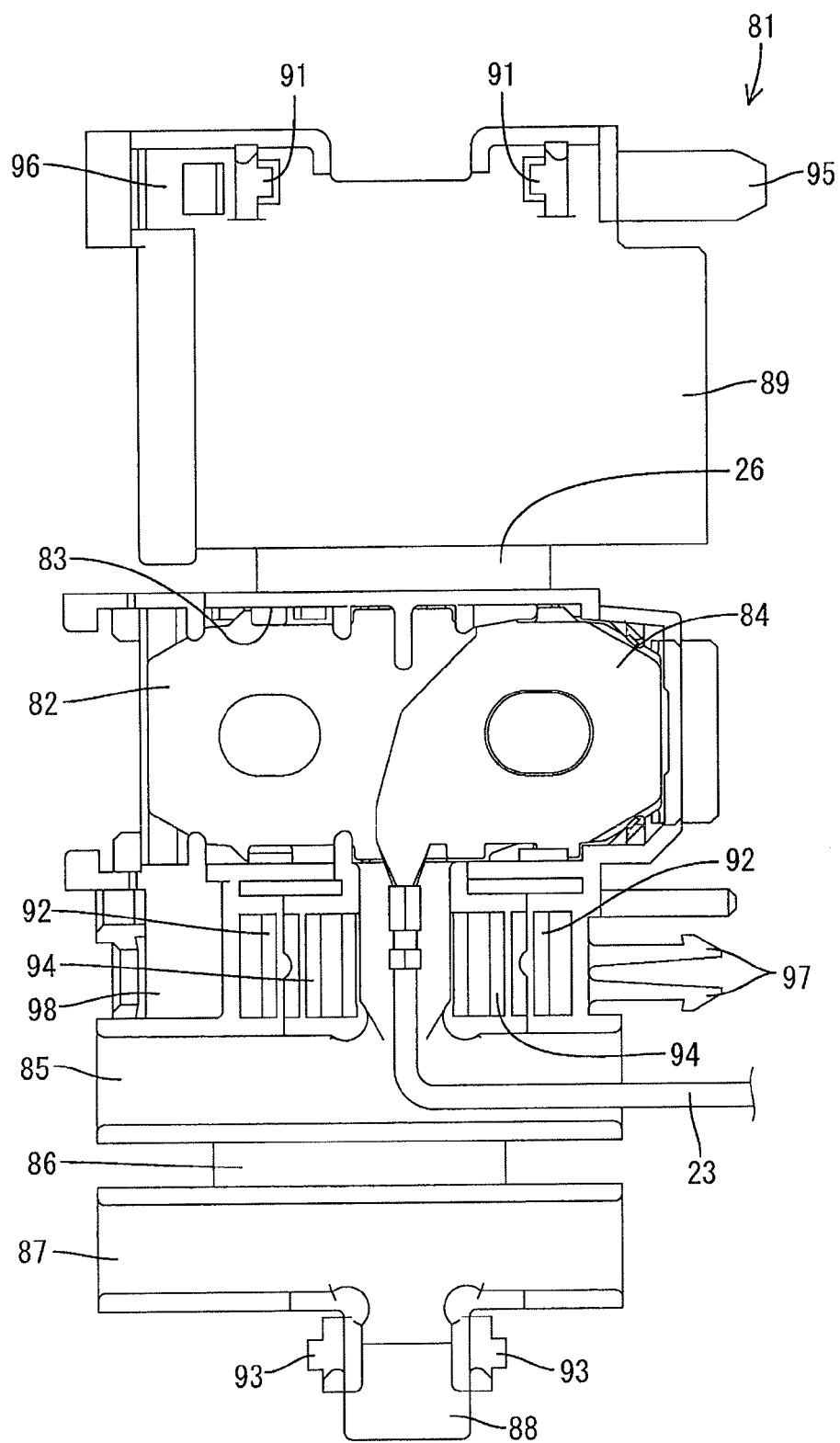
FIG. 24 is a plan view illustrating a connection unit in which a cover and a wiring cover are open.

As illustrated in FIG. 24, the connection unit 81 includes an accommodation portion 83 made of synthetic resin and accommodating a connecting member 82 therein. A voltage detection terminal 84 (a detection terminal) is provided in the accommodation portion 83 to overlap the connecting member 82. An end portion of the voltage detection line (an electric wire) 23 is connected to the voltage detection terminal 84 by a known method such as crimping. In the present embodiment, the accommodation portion 83 configures a detection terminal accommodation portion that accommodates the detection terminal.

The connection unit 81 includes a wire arrangement portion 85 in which the voltage detection lines 23 is mounted. The wire arrangement portion 85 is formed in a groove extending in the right-left direction. A wiring cover 87 covering the wire arrangement portion 85 is integrally formed with the connection unit 81. The wiring cover 87 is formed on a side wall of the wire arrangement portion 85 that is opposite to a side wall adjacent to the accommodation portion 83. The wiring cover 87 is provided to the side wall of the wire arrangement portion 85 via a wiring cover hinge 86.

Figure 25:
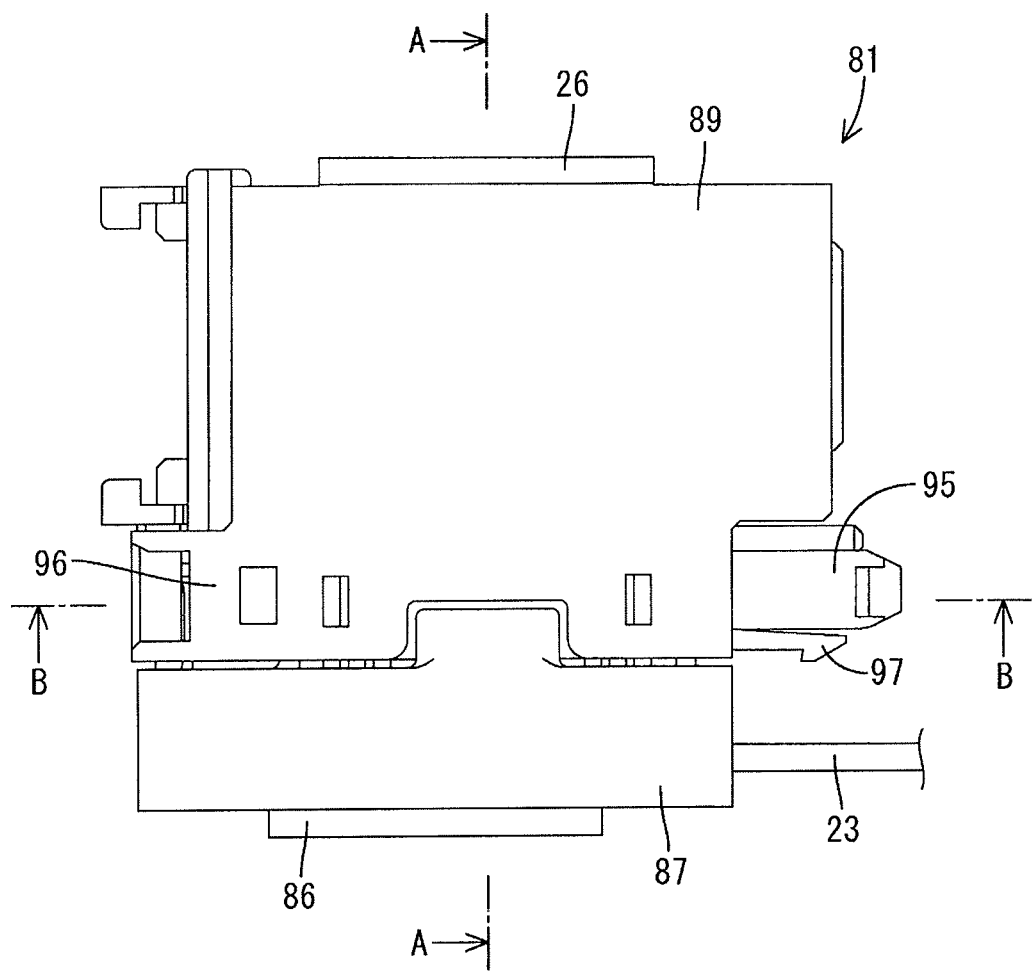
FIG. 25 is a plan view illustrating the connection unit in which the cover and the wiring cover are closed.
Figure 26:
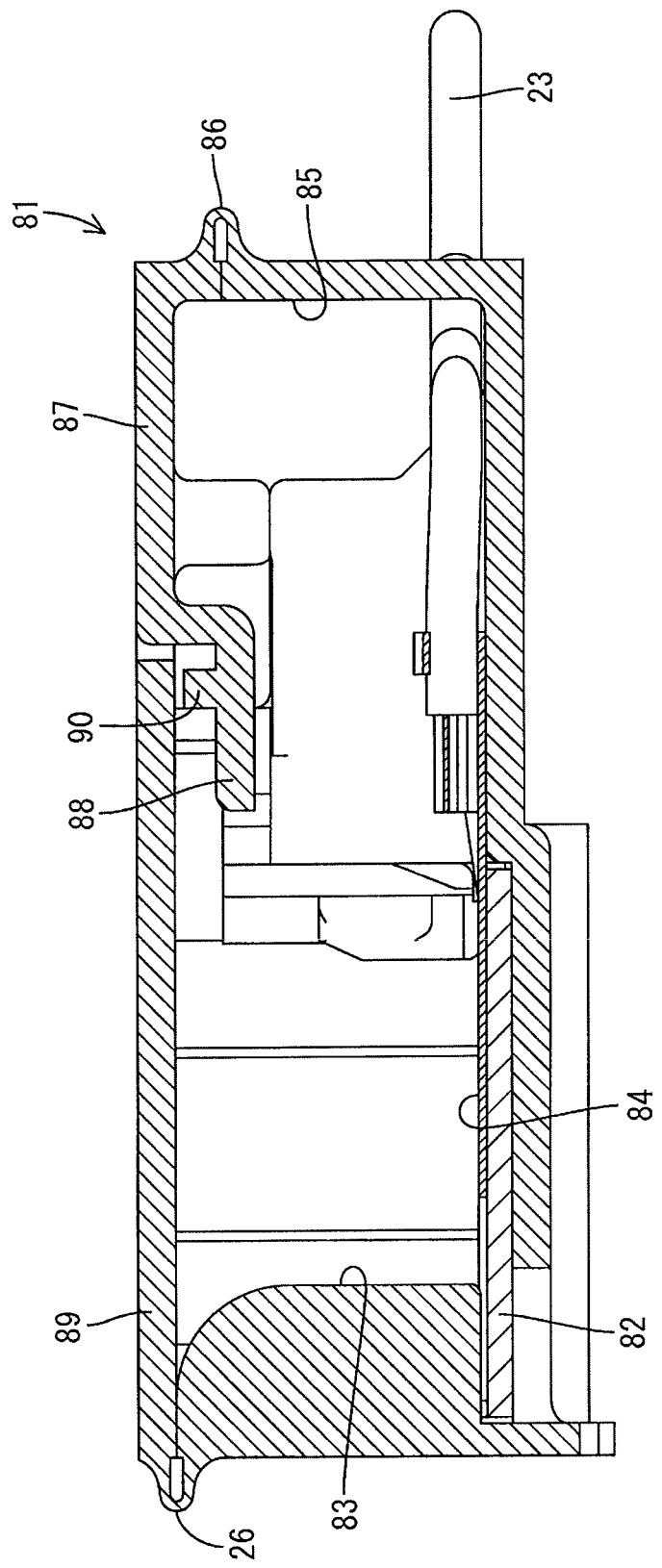
FIG. 26 is a cross-sectional view taken along an A-A line in FIG. 25.

The wiring cover 87 has an overlap portion 88 that projects from an end thereof opposite to the wiring cover hinge 86. As illustrated in FIGS. 25 and 26, a cover 89 covering the accommodation portion 83 is overlapped with the overlap portion 88.

As illustrated in FIG. 26, the overlap portion 88 is recessed inwardly in a thickness direction (the up-down direction in FIG. 26) of the wiring cover 87 to form a step in its closed state. A water stop rib 90 is formed on an upper surface of the overlap portion 88 so as to project toward the cover 89 (upwardly). The water stop rib 90 may have a height so as to be in contact with or away from a lower surface of the cover 89 in a normal state.

Figure 27:
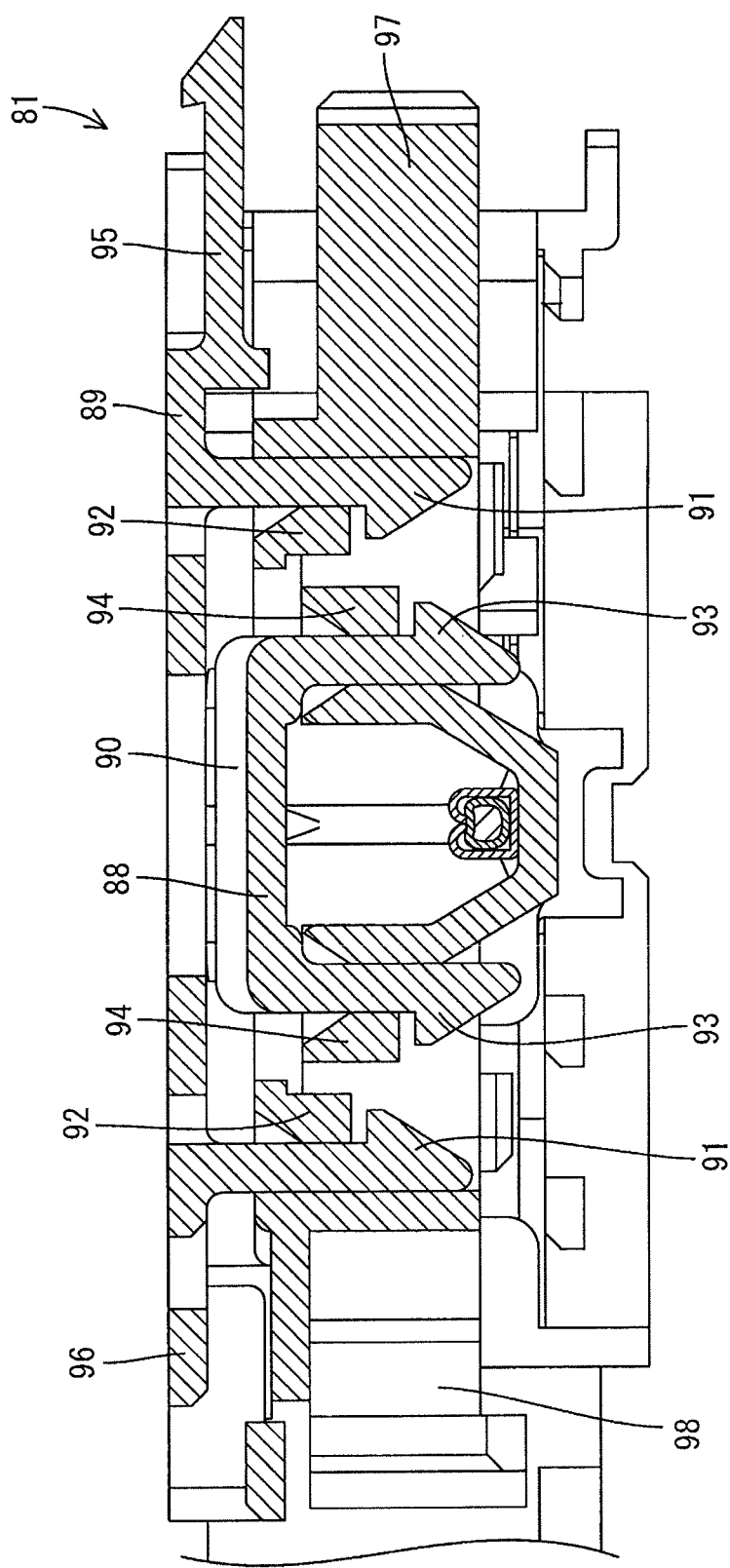
FIG. 27 is a cross-sectional view taken along a B-B line in FIG. 25.

As illustrated in FIG. 27, a cover lock 91 formed on the cover 89 is elastically fitted to a cover lock receiver 92 formed on the connection unit 81. This maintains the cover 89 to cover the accommodation portion 83.

A wiring cover lock 93 formed on the overlap portion 88 is elastically fitted to a wiring cover lock receiver 94 formed on the connection unit 81. This maintains the wiring cover 87 to cover the wire arrangement portion 85.

The cover has a cover stopper 95. The cover stopper 95 and a cover stopper receiver 96 are fitted to each other to connect the covers 89 of the adjacent connection units 81.

The connection unit 81 has a unit stopper 97. The unit stopper 97 and a unit stopper receiver 98 formed on the connection unit 81 are fitted to each other to connect the adjacent connection units 81.

Configurations other than the above configurations are same as those in the first embodiment. Same symbols are applied to components same as those in the first embodiment and explanation thereof will be omitted.

Operations and advantageous effects of the present embodiment will be explained. The connection units 81 are connected to each other and the connecting member 82 and the voltage detection terminal 84 are arranged in the accommodation portion 83 of each connection unit 81. The voltage detection wire 23 is arranged in the wire arrangement portion 85. Then, the wiring cover 87 is moved around the wiring cover hinge 86. The wiring cover lock 93 and the wiring cover lock receiver 94 are elastically fitted to each other to cover the wire arrangement portion 85 with the wiring cover 87. Accordingly, the voltage detection line 23 is less likely to go beyond the wire arrangement portion 85.

Then, the cover 89 is moved around the hinge 26 to elastically fit the cover lock 91 and the cover lock receiver each other and cover the accommodation portion 83 with the cover 89.

According to the present embodiment, each of a process of covering the accommodation portion 83 with the cover 89 and a process of covering the wire arrangement portion 85 with the wiring cover 87 can be separately executed. Therefore, the wire arrangement portion 85 can be covered with the wiring cover 87 until the process of covering the accommodation portion 83 with the cover 89 is executed. As a result, the voltage detection line 23 is less likely to go beyond the wire arrangement portion 85 until the accommodation portion 83 is covered with the cover 89.

According to the present embodiment, the wiring cover 87 has the overlap portion 88 that the end portion of the cover 89 overlaps. With this configuration, the cover 89 overlaps the overlap portion 88 of the wiring cover 87 and the wiring cover 87 is less likely to open.

According to the present embodiment, the overlap portion 88 is formed at the end of the wiring cover 87 and is recessed inwardly in a thickness direction of the wiring cover 87 to form a step. The water stop rib 90 is formed on the overlap portion 88 so as to project toward the cover 89 in the closed state of the cover 89.

The overlap portion 88 is recessed to form a step, and therefore, the thickness of the connection unit 81 as a whole is less likely to increase in the state that the cover 89 overlaps the overlap portion 88.

The water stop rib 90 is formed on the overlap portion 88. With this configuration, even if water will flows into a space between the cover 89 and the wiring cover 87, the water is less likely to enter inside the water stop rib 90. Therefore, the connecting member 82, the voltage detection line 23 and the voltage detection terminal 22 are less likely to be in contact with water.

In the closed state of the cover 89 covering the accommodation portion 83, an upper end of the water stop rib 90 supports a lower surface of the cover 89 from the lower side. Accordingly, the cover 89 is less likely to drop into the accommodation portion 83.

Other Embodiments

The present invention is not limited to the aspects explained in the above description made with reference to the drawings. The following aspects may be included in the technical scope of the present invention, for example.

(1) The direction in which the unit stopper 31 and the unit stopper receiver 33 are fitted to each other to connect the adjacent connection units 16 may not match the direction in which the cover stopper 38 and the cover stopper receiver 40 are fitted to each other to connect the covers 27.

(2) The direction in which the unit stopper 31 and the stopper receiver 33 are fitted to each other to connect the connection units 16 may not match the direction in which the batteries 12 are aligned.

(3) The direction in which the cover stopper 38 and the cover stopper receiver 40 are fitted to each other to connect the covers 27 may not match the direction in which the batteries 12 are aligned.

(4) The cover stopper 38 may be formed in a long and thin bar-like shape or a plate-like shape and the cover stopper receiver 40 may be the cover stopper hole 41 through which the cover stopper 38 is inserted. The cover stopper 38 may be formed in a long and thin bar-like shape or a plate-like shape and the cover stopper receiver 40 may be a wall surface of the cover 27 that comes in contact with the cover stopper 38. The cover stopper 38 may have a circular, an ellipsoidal, or an oval cross sectional shape or may have a polygonal cross sectional shape such as a triangular cross section or a rectangular cross section. The cross sectional shape of the cover stopper 38 may have any shape.

(5) The end side connection unit may include both of the end side unit stopper and the end side unit stopper receiver. The end side cover may include both of the end side cover stopper and the end side cover stopper receiver.

(6) The battery connecting assembly 14 may be applied to the battery module 10 including the batteries that are connected in parallel to each other.

(7) The stopper and the stopper receiver may be fitted without having any clearance therebetween. For example, the unit stopper and the cover stopper may be formed in a rib and the unit stopper receiver and the cover stopper receiver may be formed in a recess. With this configuration, the unit stopper may be fitted to the unit stopper receiver with being pressured, and the cover stopper may be fitted to the cover stopper receiver with being pressured.

(8) The battery 12 of the present embodiments includes a pair of electrode terminals 11 on its upper surface. However, one electrode terminal 11 may be formed on the upper surface of the battery 12 and one electrode terminal 11 may be formed on a lower surface of the battery 12.

(9) In the above embodiments, the twelve batteries 12 are connected in series. However, the number of the batteries 12 may be from two to eleven or may be thirteen or more. The batteries may be connected in parallel to each other.

(10) In the first embodiment, five or six connection units 16 are connected to each other. However, the desired number of connection units 16, for example, two to four or seven or more connection units 16 may be connected to each other.

(11) In the second embodiment, the wiring cover 87 includes the overlap portion 88. However, the wiring cover 87 may not include the overlap portion 88. Without having the overlap portion 88, the end portion of the cover 87 does not overlap the end portion of the wiring cover 87.

(12) In the second embodiment, the overlap portion 88 has the water stop rib 90. However, the overlap portion 88 may not have the water stop rib 90.

(13) In the second embodiment, the cover 89 overlaps the overlap portion 88 formed on the end portion of the wiring cover 87. However, the cover 89 may cover an entire area of the wiring cover 87.

(14) In the above embodiments, the accommodation portion 83 accommodating the connecting member 82 therein also configures as the detection terminal accommodation portion that accommodates the voltage detection terminal 84. However, the detection terminal accommodation portion accommodating the voltage detection terminal 84 may be formed in a position different from the position in which the accommodation portion 83 accommodating the connecting member 82.

(15) In the above embodiments, the detection terminal is the voltage detection terminal 84 that detects voltage of the battery 12. However, the detection terminal may detect temperature or a current of the battery. The detection terminal may detect any information regarding the condition of the battery 12.

(16) The method of assembling the battery connecting assembly 14 of the above embodiment may not be limited to the one described above. For example, after all the connection units 16 may be connected to each other, the connecting member 17 may be arranged in each accommodation portion 19 and thereafter, the voltage detection terminal 22 and the voltage detection line 23 may be arranged.

Problems to be Solved by the Technology Described in the Specification

If any foreign obstacle comes in contact with the connecting member or the electrode terminal, any problem such as short circuit may be caused. Therefore, the cover covering an entire battery connecting assembly is formed separately from the battery connecting assembly, and the cover is attached to the battery module. Accordingly, the foreign obstacle is less likely to be in contact with the connecting member and the electrode terminal.

However, with the above configuration, if the number of batteries increases, the cover is also increased in size. Accordingly, a mold for molding the cover is also increased in size. This increases a cost for manufacturing the mold.

To solve the above problem, in the battery connecting assembly of the prior art, the connecting member cover covering an area in which the connecting member is arranged may be provided integrally with each of the connection units.

With this configuration, it is expected that foreign obstacles are less likely to be in contact with the connecting member and the electrode terminal by the connecting member cover. Further, if the number of batteries increases, the number of connection units that are connected to each other can be increased. Namely, only one mold for molding one connection unit is necessary to be manufactured to mold a predetermined number of connection units. Therefore, the mold is not necessary to be increased in size and a cost for manufacturing the mold is less likely to increase.

However, with the above configuration, after the battery connecting assembly is attached to the batteries that are aligned, the operation of closing the connecting member cover of each connection unit is necessarily carried out for every connection unit. This operation becomes troublesome if the number of batteries increases and the number of connection units increases.

The technology described in the specification was accomplished in view of the foregoing circumstances. An object of the technology is to provide a battery connecting assembly that reduces a manufacturing cost and simplifies a process of mounting the battery connecting assembly to a battery.

According to the technology described in the specification, a battery connecting assembly in a battery module connects batteries having electrode terminals. The batteries are aligned to configure a battery group. The battery connecting assembly includes a plurality of connection units in which a connecting member connecting the electrode terminals of adjacent batteries is arranged. Each of the connection units includes an accommodation portion in which the connecting member is arranged, a cover configured to cover the accommodation portion, and a hinge connecting the accommodation portion and the cover. The cover includes a cover stopper and a cover stopper receiver that is configured to fit to the cover stopper of an adjacent connection unit. Each of the connection units further includes a unit stopper, and a unit stopper receiver configured to fit to the unit stopper of the adjacent connection unit. The connection units are connected to each other such that the unit stoppers and the unit stopper receivers are fitted to each other and the covers of the connection units are connected to each other such that the cover stoppers and the cover stopper receivers are fitted to each other.

According to the technology described in the specification, the cover covers the accommodation portion, and therefore, the connecting member arranged in the accommodation portion and the electrode terminals connected to the connecting member are less likely to be in contact with any foreign obstacles.

According to the technology described in the specification, the connection unit integrally includes the cover. Therefore, if the number of batteries increases, the number of connection units to be connected can be also increased. Namely, only one mold for molding one connection unit is necessary to be manufactured to mold a predetermined number of connection units. Therefore, the mold is not necessary to be increased in size and a cost for manufacturing the mold is less likely to increase.

According to the technology described in the specification, the covers are connected to each other by fitting of the cover stoppers and the cover stopper receivers. With this configuration, after the battery connecting assembly is attached to the aligned batteries, the operation of closing the connected covers that configures one component is carried out only once to close the covers of the connection units and cover all of the accommodation portions of the connection units. This improves efficiency of assembling the battery connecting assembly to the batteries.

The technology described in the specification may be configured as follows.

Each of the unit stoppers may have a unit stopper projection, and each of the unit stopper receivers may have a unit stopper hole through which the unit stopper projection is fitted, and the unit stopper projection may be stopped by an opening edge of the unit stopper hole.

With the above configuration, the connection units are connected to each other with a simple configuration in which the unit stopper projection is stopped by the opening edge of the unit stopper hole.

Each of the cover stoppers may have a cover stopper projection, and each of the cover stopper receiver may have a cover stopper hole through which the cover stopper projection is fitted, and the cover stopper projection may be stopped by an opening edge of the cover stopper hole.

With the above configuration, the covers are connected to each other with a simple configuration in which the cover stopper projection is stopped by the opening edge of the cover stopper hole.

In applying such a stopper configuration in which the stopper projection is stopped by the opening edge of the stopper hole, a predetermined clearance is formed between an opening edge of the stopper hole and the stopper projection. If such a clearance is not provided, the stopper projection may not be stopped by the opening edge of the stopper hole due to a small dimension error. The predetermined clearance corresponds to a clearance range that is formed between an opening edge of a stopper hole and a stopper projection in a general stopper mechanism in which the stopper projection is stopped by an opening edge of the stopper hole.

In the configuration of the battery group including the batteries that are aligned, a tolerance caused in assembling the batteries in its alignment direction and a tolerance in size of the electrode terminals provided on each battery are accumulated in the alignment direction in which the batteries are aligned. Therefore, as is closer to ends of the battery group in the alignment direction of the batteries, a position gap is likely to be generated between the electrode terminals of the battery and the connecting member of the battery connecting assembly. With the above configuration, the predetermined clearance is provided between an opening edge of the unit stopper hole and the unit stopper projection, and the predetermined clearance is provided between an opening edge of the cover stopper hole and the cover stopper projection. The clearance absorbs a tolerance caused in assembling the batteries in its alignment direction and a tolerance in size of the electrode terminals provided on each battery. With the above configuration, any special configuration is not required to absorb a tolerance caused in assembling the batteries in its alignment direction and a tolerance in size of the electrode terminals provided on each battery.

The accommodation portion may have an opening, and the cover may have a surface facing the accommodation portion in a state of covering the accommodation portion, and the cover may have a rib on the surface so as to project toward the accommodation portion and fit to the opening.

With such a configuration, if the cover covers the accommodation portion, the rib formed on the cover is fitted to the opening of the accommodation portion. Accordingly, even if the cover is open slightly, any foreign obstacles are less likely to enter the accommodation portion due to the rib entering the accommodation portion.

A direction in which the unit stopper is fitted to the unit stopper receiver may match a direction in which the cover stopper is fitted to the cover stopper receiver.

With the above configuration, the direction in which the unit stopper and the unit stopper receiver are fitted to each other in connecting the adjacent connection units matches the direction in which the cover stopper and the cover stopper receiver are fitted to each other in connecting the covers formed on the adjacent connection units. Therefore, a process of connecting the adjacent connection units and a process of connecting the covers formed on the adjacent connection units are carried out with one operation. This improves efficiency of an assembling process of the battery connecting assembly.

The battery connecting assembly may further include an end side connection unit, and the end side connection unit may include an end side connecting member accommodation portion in which an end side connecting member is arranged, an end side cover configured to cover the end side connecting member accommodation portion, and a main hinge connecting the end side connecting member accommodation portion and the end side cover. The end side connecting member may be configured to connect the electrode terminal and a power conductor. The end side cover may include one or both of an end side cover stopper configured to fit to the cover stopper receiver formed on the cover of the adjacent connection unit and an end side cover stopper receiver configured to fit to the cover stopper formed on the cover of the adjacent connection unit. The end side connection unit may further include one or both of an end side unit stopper configured to fit to the unit stopper receiver formed on the adjacent connection unit and an end side unit stopper receiver configured to fit to the unit stopper of the adjacent connection unit. The end side connection unit may be connected to the connection unit by one of fitting of the unit stopper receiver and the end side unit stopper and fitting of the unit stopper and the end side unit stopper receiver, and the end side cover may be connected to the cover by one of fitting of the cover stopper receiver and the end side cover stopper and fitting of the cover stopper and the end side cover stopper receiver.

With the above configuration, the electrode terminals of the battery and the power conductor are connected to each other at an end portion of the battery group. The power conductor may be any conductor such as an electric wire or a bus bar.

The end side cover may include an auxiliary hinge, and a portion of the end side cover corresponding to a portion in which the end side connecting member is connected to the power conductor may be opened and closed by the auxiliary hinge.

With the above configuration, the covers are connected to each other and the end side cover is connected to the cover located at the end. Accordingly, the operation of closing the covers and the end cover that are connected to each other to configure one component is carried out only once to close all of the accommodation portions and the end side connecting portion accommodation portion formed on the connection units with the covers and the end side cover. This improves operation efficiency of assembling the battery connecting assembly to the batteries.

However, with the above configuration, the process of connecting the power conductor to the end side connecting member may be necessarily carried out before the process of covering the accommodation portion and the end side connecting member accommodation portion with the covers and the end side cover. This may cause some restriction in the operation process.

The end side cover may include an auxiliary hinge, and a portion of the end side cover corresponding to a portion in which the end side connecting member is connected to the power conductor may be opened and closed by the auxiliary hinge. As a result, after executing the process of covering the accommodation portions, the end side connecting member accommodation portion with the covers and the end side cover, the portion of the end side cover corresponding to the portion in which the end side connecting member and the power conductor are connected to each other can be opened via the auxiliary hinge. Therefore, even after the process of covering the accommodation portions and the end side connecting member accommodation portion with the covers and the end side cover, the end side connecting member and the power conductor are connected to each other. After connecting the end side connecting member and the power conductor, the portion of the end side cover in which the end side connecting member and the power conductor are connected is closed via the auxiliary hinge. Therefore, any foreign obstacles are less likely to be in contact with the connecting member and the end side connecting member. As a result, the process of connecting the end side connecting member and the power conductor is carried out before or after the process of covering the accommodation portion and the end side connecting member accommodation portion with the covers and the end side cover. With this configuration, the process of assembling the battery connecting assembly is carried out in various ways.

Each of the unit stoppers may have a unit stopper projection. Each of the unit stopper receivers may have a unit stopper hole through which the unit stopper projection is fitted. The unit stopper projection may be stopped by an opening edge of the unit stopper hole. Each of the cover stoppers may have a cover stopper projection. Each of the cover stopper receivers may have a cover stopper hole through which the cover stopper projection is fitted. The cover stopper projection may be stopped by an opening edge of the cover stopper hole. The end side unit stopper may have an end side unit stopper projection and the end side unit stopper projection may be stopped by an opening edge of the unit stopper hole. The end side unit stopper receiver may have an end side unit stopper hole through which the unit stopper projection is fitted. The unit stopper projection may be stopped by an opening edge of the end side unit stopper hole. The end side cover stopper may have an end side cover stopper projection that is configured to be stopped by an opening edge of the cover stopper hole. The end side cover stopper receiver may have an end side cover stopper hole through which the cover stopper projection is configured to fit. The cover stopper projection may be stopped by an opening edge of the end side cover stopper hole.

With such a simple configuration in which the end side unit stopper projection is stopped by the opening edge of the unit stopper hole, or a simple configuration in which the unit stopper projection is stopped by the opening edge of the end side unit stopper hole, the connection units and the end side connection units are connected to each other. With a simple configuration in which the cover stopper projection is stopped by the opening edge of the end side cover stopper hole, or a simple configuration in which the end side cover stopper projection is stopped by the opening edge of the cover stopper hole, the cover and the end cover are connected to each other.

As is described above, in the configuration of the battery group including batteries that are aligned, a tolerance caused in assembling the batteries and a tolerance in size of the electrode terminals provided on each battery are accumulated in the alignment direction in which the batteries are aligned. Therefore, as is closer to ends of the battery group in the alignment direction of the batteries, a position gap is likely to be generated between the electrode terminals of the battery and the connecting member of the battery connecting assembly. Especially, the position gap may be greater in the end side connection unit connected to the end of the connection unit. With the above configuration, a predetermined clearance is provided between the opening edge of the unit stopper hole and the unit stopper projection and between the opening edge of the cover stopper hole and the cover stopper projection. The clearance absorbs a tolerance caused in assembling the batteries in its alignment direction and a tolerance in size of the electrode terminals provided on each battery.

The end side connecting member accommodation portion may have an opening, and the end side cover may have a surface facing the accommodation portion in a state of covering the end side connecting member accommodation portion, and the end side cover may have an end side rib on the surface so as to project toward the end side connecting member accommodation portion and fit to the opening.

With such a configuration, if the end cover is closed to cover the end side connecting member accommodation portion, the end side rib formed on the end side cover fits into the opening of the end side connecting member accommodation portion. With this configuration, if the end cover is slightly open, any foreign obstacle is less likely to enter the end side connecting member accommodation portion due to by the end side rib fitting into the end side connecting member accommodation portion.

A direction in which the end side unit stopper and the unit stopper receiver are fitted to each other, a direction in which the unit stopper and the end side unit stopper receiver are fitted to each other, a direction in which the cover stopper and the end side cover stopper receiver are fitted to each other, and a direction in which the end side cover stopper and the cover stopper receiver are fitted to each other match each other.

With the above configuration, a direction in which the connection unit and the end side connection unit are connected matches a direction in which the cover and the end side cover are connected. Therefore, a process of connecting the connection unit and the end side connection unit and a process of connecting the cover and the end side cover are carried out with one operation. This improves efficiency of an assembling process of the battery connecting assembly.

The connection unit may further include a detection terminal accommodation portion in which a detection terminal configured to detect a condition of the battery is arranged, a wire arrangement portion in which an electric wire connected to the detection terminal is arranged, and a wiring cover connected to the wire arrangement portion via a wiring cover hinge and configured to cover the wire arrangement portion.

With the above configuration, each of a process of covering the accommodation portion with the cover and a process of covering the wire arrangement portion with the wiring cover can be separately executed. Therefore, the wire arrangement portion can be covered with the wiring cover first and then, the process of covering the accommodation portion with the cover is executed. Accordingly, the electric wire is less likely to be exposed from the wire arrangement portion until the accommodation portion is covered with the cover. As a result, the electric wire is less likely to go beyond the wire arrangement portion until the process of covering the accommodation portion with the cover is executed.

The wiring cover may include an overlap portion configured to overlap the cover.

With the above configuration, the cover is overlapped with the overlap portion of the wiring cover, and therefore, the wiring cover is less likely to be open.

The overlap portion may be formed at an end portion of the wiring cover and recessed inwardly with respect to a thickness direction of the wiring cover to form a step. The overlap portion may have a water stop rib that projects toward the cover in a closed state of the cover.

With the above configuration, the overlap portion is formed to be recessed and form a step. Therefore, the thickness of the connection unit as a whole is less likely to increase in the state in which the cover overlaps the overlap portion.

With the above configuration, the water stop rib is formed on the overlap portion. Therefore, if water is likely to enter a space between the cover and the wiring cover, water is less likely to enter inside the water stop rib.

Advantageous Effects of the Technology Described in the Specification

According to the technology described in the specification, a cost for manufacturing the battery connecting assembly is reduced and a process of mounting the battery connecting assembly to a battery is simplified.

The invention claimed is:
1. A battery connecting assembly in a battery module, the battery connecting assembly connecting batteries having electrode terminals, the batteries being aligned to configure a battery group, the battery connecting assembly comprising:
  a plurality of connection units in which a connecting member connecting the electrode terminals of adjacent batteries is arranged, each of the connection units including:
    an accommodation portion in which the connecting member is arranged,
    a cover configured to cover the accommodation portion, the cover including a cover stopper and a cover stopper receiver that is configured to fit to the cover stopper of an adjacent connection unit,
    a hinge connecting the accommodation portion and the cover,
    a unit stopper, and
    a unit stopper receiver configured to fit to the unit stopper of the adjacent connection unit, wherein
  the connection units are connected to each other such that the unit stoppers and the unit stopper receivers are fitted to each other and the covers of the connection units are connected to each other such that the cover stoppers and the cover stopper receivers are fitted to each other.

2. The battery connecting assembly according to claim 1, wherein
  each of the unit stoppers has a unit stopper projection,
  each of the unit stopper receivers has a unit stopper hole through which the unit stopper projection is fitted, and
  the unit stopper projection is stopped by an opening edge of the unit stopper hole.

3. The battery connecting assembly according to claim 2, wherein
  each of the cover stoppers has a cover stopper projection,
  each of the cover stopper receiver has a cover stopper hole through which the cover stopper projection is fitted, and
  the cover stopper projection is stopped by an opening edge of the cover stopper hole.

4. The battery connecting assembly according to claim 1, wherein
  the accommodation portion has an opening, and
  the cover has a surface facing the accommodation portion in a state of covering the accommodation portion, the cover has a rib on the surface so as to project toward the accommodation portion and fit to the opening.

5. The battery connecting assembly according to claim 1, wherein a direction in which the unit stopper is fitted to the unit stopper receiver matches a direction in which the cover stopper is fitted to the cover stopper receiver.

6. The battery connecting assembly according to claim 1, wherein the connection unit further includes:
a detection terminal accommodation portion in which a detection terminal configured to detect a condition of the battery is arranged,
a wire arrangement portion in which an electric wire connected to the detection terminal is arranged, and
a wiring cover connected to the wire arrangement portion via a wiring cover hinge, the wiring cover configured to cover the wire arrangement portion.

7. The battery connecting assembly according to claim 6, wherein the wiring cover includes an overlap portion configured to overlap the cover.

8. The battery connecting assembly according to claim 7, wherein
the overlap portion is formed at an end portion of the wiring cover and recessed inwardly with respect to a thickness direction of the wiring cover to form a step, and
the overlap portion has a water stop rib that projects toward the cover in a closed state of the cover.

9. The battery connecting assembly according to claim 1, further comprising an end side connection unit, the end side connection unit includes:
an end side connecting member accommodation portion in which an end side connecting member is arranged, the end side connecting member configured to connect the electrode terminal and a power conductor,
an end side cover configured to cover the end side connecting member accommodation portion, the end side cover including one or both of an end side cover stopper configured to fit to the cover stopper receiver formed on the cover of the adjacent connection unit and an end side cover stopper receiver configured to fit to the cover stopper formed on the cover of the adjacent connection unit,
a main hinge connecting the end side connecting member accommodation portion and the end side cover, and
one or both of an end side unit stopper configured to fit to the unit stopper receiver formed on the adjacent connection unit and an end side unit stopper receiver configured to fit to the unit stopper of the adjacent connection unit, wherein
the end side connection unit is connected to the connection unit by one of fitting of the unit stopper receiver and the end side unit stopper and fitting of the unit stopper and the end side unit stopper receiver, and
the end side cover is connected to the cover by one of fitting of the cover stopper receiver and the end side cover stopper and fitting of the cover stopper and the end side cover stopper receiver.

10. The battery connecting assembly according to claim 9, wherein
the end side cover includes an auxiliary hinge, and
a portion of the end side cover corresponding to a portion in which the end side connecting member is connected to the power conductor is opened and closed by the auxiliary hinge.

11. The battery connecting assembly according to claim 10, wherein
each of the unit stoppers has a unit stopper projection,
each of the unit stopper receivers has a unit stopper hole through which the unit stopper projection is fitted,
the unit stopper projection is stopped by an opening edge of the unit stopper hole,
each of the cover stoppers has a cover stopper projection,
each of the cover stopper receivers has a cover stopper hole through which the cover stopper projection is fitted,
the cover stopper projection is stopped by an opening edge of the cover stopper hole,
the end side unit stopper has an end side unit stopper projection and the end side unit stopper projection is stopped by an opening edge of the unit stopper hole,
the end side unit stopper receiver has an end side unit stopper hole through which the unit stopper projection is fitted,
the unit stopper projection is stopped by an opening edge of the end side unit stopper hole, and
the end side cover stopper has an end side cover stopper projection that is configured to be stopped by an opening edge of the cover stopper hole,
the end side cover stopper receiver has an end side cover stopper hole through which the cover stopper projection is configured to fit, and
the cover stopper projection is stopped by an opening edge of the end side cover stopper hole.

12. The battery connecting assembly according to claim 9, wherein
each of the unit stoppers has a unit stopper projection,
each of the unit stopper receivers has a unit stopper hole through which the unit stopper projection is fitted,
the unit stopper projection is stopped by an opening edge of the unit stopper hole,
each of the cover stoppers has a cover stopper projection,
each of the cover stopper receivers has a cover stopper hole through which the cover stopper projection is fitted,
the cover stopper projection is stopped by an opening edge of the cover stopper hole,
the end side unit stopper has an end side unit stopper projection and the end side unit stopper projection is stopped by an opening edge of the unit stopper hole,
the end side unit stopper receiver has an end side unit stopper hole through which the unit stopper projection is fitted,
the unit stopper projection is stopped by an opening edge of the end side unit stopper hole, and
the end side cover stopper has an end side cover stopper projection that is configured to be stopped by an opening edge of the cover stopper hole,
the end side cover stopper receiver has an end side cover stopper hole through which the cover stopper projection is configured to fit, and
the cover stopper projection is stopped by an opening edge of the end side cover stopper hole.

13. The battery connecting assembly according to claim 9, wherein
the end side connecting member accommodation portion has an opening, and
the end side cover has a surface facing the accommodation portion in a state of covering the end side connecting member accommodation portion, the end side cover has an end side rib on the surface so as to project toward the end side connecting member accommodation portion and fit to the opening.

14. The battery connecting assembly according to claim 9, wherein a direction in which the end side unit stopper and the unit stopper receiver are fitted to each other, a direction in which the unit stopper and the end side unit stopper receiver are fitted to each other, a direction in which the cover stopper and the end side cover stopper receiver are fitted to each other, and a direction in which the end side cover stopper and the cover stopper receiver are fitted to each other match each other.

* * * * *